(12) United States Patent
Njiende et al.

(10) Patent No.: US 10,325,714 B2
(45) Date of Patent: Jun. 18, 2019

(54) INTEGRATED MAGNETIC COMPONENT AND SWITCHED MODE POWER CONVERTER

(71) Applicant: DET International Holding Limited, George Town (KY)

(72) Inventors: Hugues Njiende, Paderborn (DE); Sergey Tikhonov, Soest (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 0 days.

(21) Appl. No.: 15/868,744

(22) Filed: Jan. 11, 2018

(65) Prior Publication Data

US 2018/0197673 A1 Jul. 12, 2018

(30) Foreign Application Priority Data

Jan. 12, 2017 (EP) .................................. 17151232

(51) Int. Cl.
*H01F 27/28* (2006.01)
*H01F 27/24* (2006.01)
(Continued)

(52) U.S. Cl.
CPC .......... *H01F 27/2823* (2013.01); *H01F 3/10* (2013.01); *H01F 27/06* (2013.01); *H01F 27/24* (2013.01);
(Continued)

(58) Field of Classification Search
CPC ............... H01F 41/0233; H01F 27/346; H01F 2027/065; H02M 3/28; H02M 3/3376; Y10T 29/609
(Continued)

(56) References Cited

U.S. PATENT DOCUMENTS 4,620,144 A * 10/1986 Bolduc .................. H01F 29/14
 323/250
5,317,300 A * 5/1994 Boesel .................. H01F 27/022
 264/272.19
(Continued)

FOREIGN PATENT DOCUMENTS

CN 104376981 A 2/2015
EP 2299456 A1 3/2011

OTHER PUBLICATIONS

European Search Report for EP application No. 17151232.0, Issued by the European Patent Office, dated Aug. 23, 2017.

*Primary Examiner* — Rajnikant B Patel
(74) *Attorney, Agent, or Firm* — Vector IP Law Group LLC; Robert S. Babayi

(57) ABSTRACT

The invention related to an integrated magnetic component for a switched mode power converter. The integrated magnetic component comprises a single magnetic core structure formed by magnetic core elements, wherein at least one of the magnetic core elements is a leg-core-element with a flange and one or more legs are arranged on one side of the flange. The magnetic core elements of the single magnetic core structure are linearly stacked. The integrated magnetic component further comprises an isolating transformer with a higher current transformer winding arranged on at least one leg of the magnetic core elements, a lower current transformer winding arranged on at least one leg of the magnetic core elements and a first filter inductor comprising a first filter winding, arranged on at least one leg of the magnetic core elements. Herein the higher current transformer winding and the filter winding comprise at least an edgewise wound winding part. The invention further relates to a switched mode power converter.

17 Claims, 13 Drawing Sheets

(51) Int. Cl.
*H01F 27/06* (2006.01)
*H02M 3/337* (2006.01)
*H01F 27/34* (2006.01)
*H01F 3/10* (2006.01)
*H01F 27/40* (2006.01)

(52) U.S. Cl.
CPC ....... *H01F 27/2866* (2013.01); *H01F 27/346* (2013.01); *H01F 27/40* (2013.01); *H02M 3/337* (2013.01); *H01F 2027/065* (2013.01); *H01F 2027/408* (2013.01)

(58) Field of Classification Search
USPC ... 363/16–17, 21.02, 21.03, 25, 97, 98, 132, 363/134, 127; 336/66, 65, 213, 217, 216
See application file for complete search history.

(56) References Cited

U.S. PATENT DOCUMENTS

| | | | |
|---|---|---|---|
| 5,416,458 A * | 5/1995 | Menke | H01F 27/34 336/12 |
| 5,555,494 A * | 9/1996 | Morris | H02M 3/337 363/132 |
| 5,671,526 A * | 9/1997 | Merlano | H01F 41/0233 29/609 |
| 6,069,798 A * | 5/2000 | Liu | H02M 3/33569 363/134 |
| 6,163,466 A | 12/2000 | Davila, Jr. et al. | |
| 6,549,436 B1 | 4/2003 | Sun | |
| 6,784,644 B2 | 8/2004 | Xu et al. | |
| 6,980,077 B1 | 12/2005 | Chandrasekaran et al. | |
| 7,034,647 B2 | 4/2006 | Yan et al. | |
| 7,352,596 B2 * | 4/2008 | Cheng | H02M 3/3372 363/24 |
| 7,646,281 B2 * | 1/2010 | Diekmann | H01F 27/263 336/234 |
| 9,406,419 B2 * | 8/2016 | Njiende T. | H01F 3/10 |
| 2008/0224809 A1 | 9/2008 | Zhang et al. | |
| 2008/0224812 A1 * | 9/2008 | Chandrasekaran | H01F 27/38 336/212 |
| 2013/0343091 A1 * | 12/2013 | Njiende T. | H01F 30/06 363/16 |
| 2016/0300658 A1 | 10/2016 | Wu et al. | |

* cited by examiner

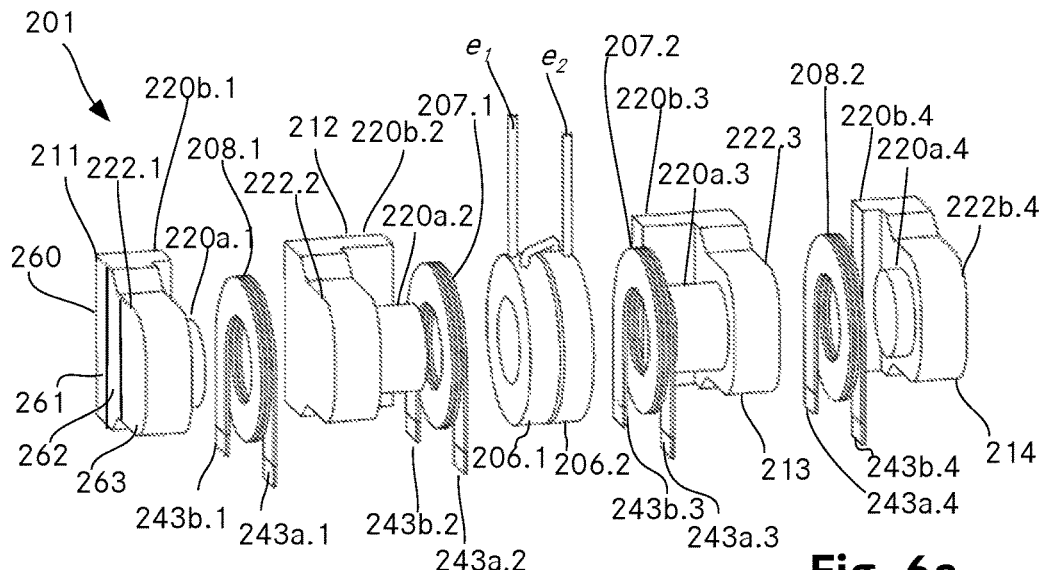
Fig. 6a
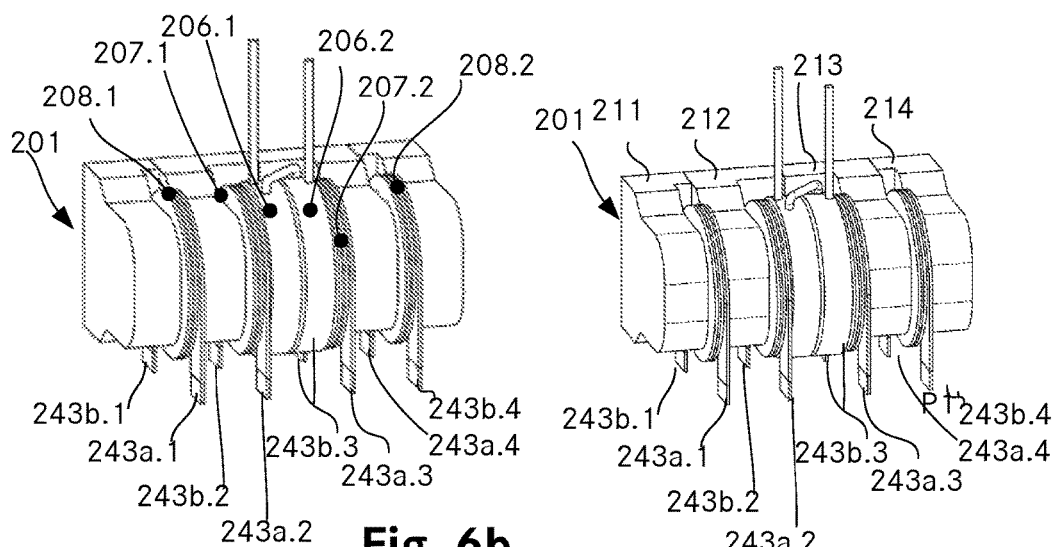
Fig. 6b
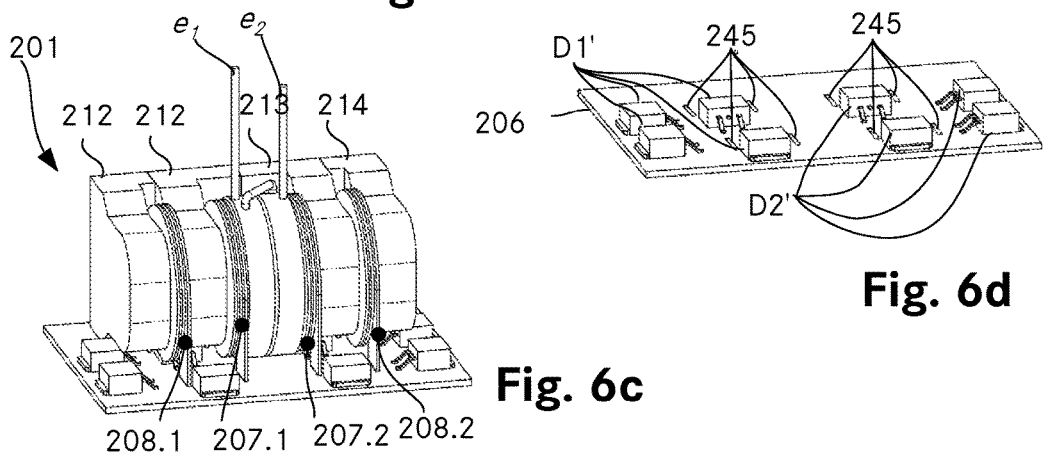
Fig. 6c
Fig. 6d

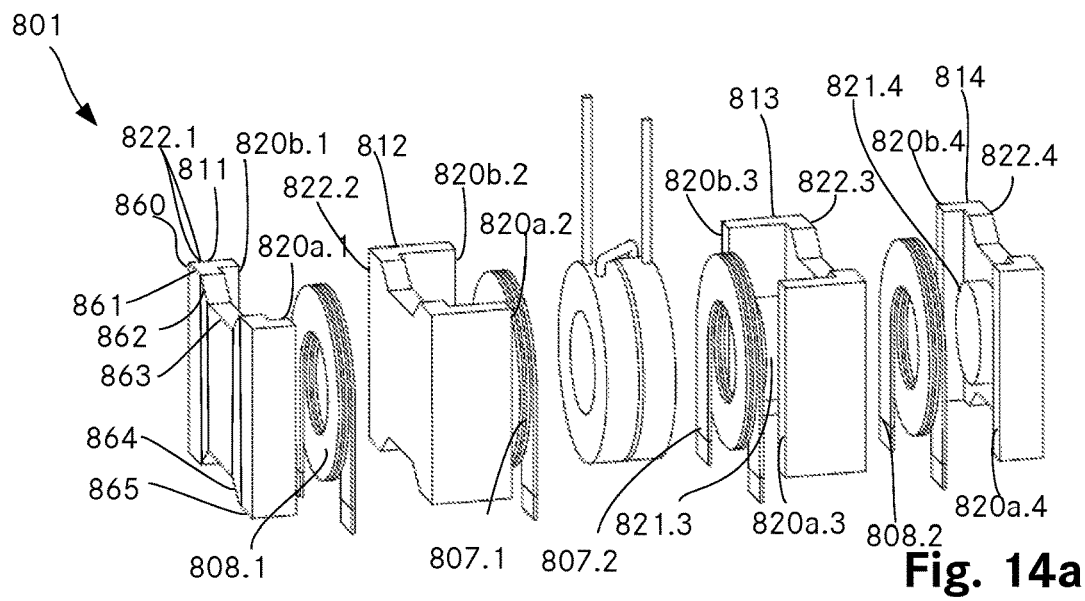
Fig. 14a
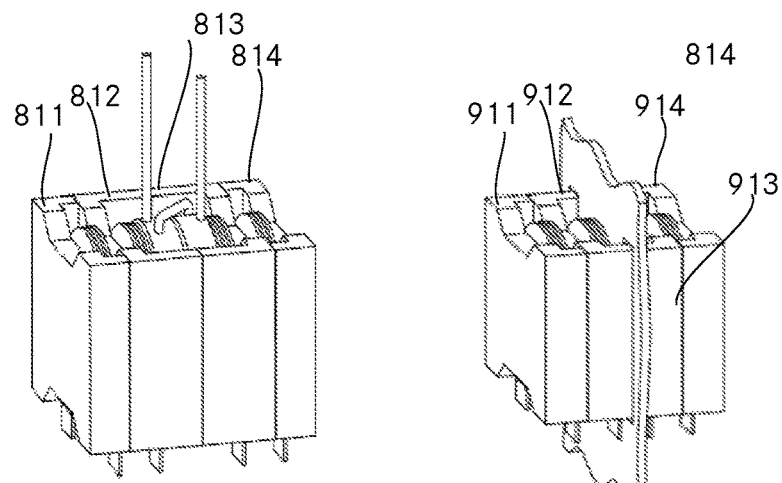
Fig. 14b
Fig. 15b
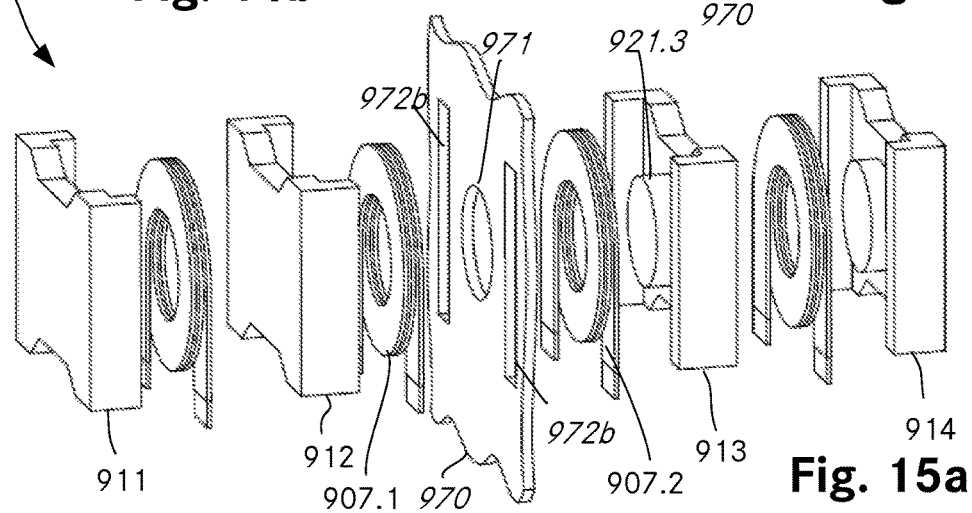
Fig. 15a

INTEGRATED MAGNETIC COMPONENT AND SWITCHED MODE POWER CONVERTER

TECHNICAL FIELD

This invention relates to an integrated magnetic component for a switched mode power converter which comprises a single magnetic core structure formed by magnetic core elements, wherein at least one of the magnetic core elements is a leg-core-element with a flange and one or more legs arranged on one side of the flange, and wherein the magnetic core elements are linearly stacked. The integrated magnetic component further comprises an isolating transformer, with a higher current transformer winding arranged on at least one leg of the magnetic core elements and a lower current transformer winding arranged on at least one leg of the magnetic core elements, and a first filter inductor comprising a first filter winding arranged on at least one leg of the magnetic core elements.

BACKGROUND ART

Switched mode power supplies as main parts of telecom and commercial systems often dictate their size and electrical performance as well as reliability and costs. As requirements for the key characteristics power density and efficiency of power converters increase, the demands of these evaluation characteristics increase for inductive components particularly. One approach of increasing the power density and the efficiency is to integrate inductive components. Transformers and inductors can be integrated into a single magnetic structure which than reduces cost, increases power density and power efficiency.

A circuit where integrated magnetics is strongly recommended is the current doubler-rectifier which can be used with different double-ended primary topologies such as forward, two transistors-forward, push-pull, half bridge or full bridge converters. The current-doubler rectifier circuit, habitually applied for low voltage and high current outputs, uses one simple two-winding transformer and two output inductors. The current-doubler rectifier then exhibits lower conduction losses than the conventional center tapped rectifier. This configuration results, additionally to the number of discrete magnetic components which yield higher size and costs, in three high current windings and several high interconnection losses which negatively impact the efficiency.

In U.S. Pat. No. 6,784,644 (Virginia Tech Intellectual Properties Inc.), an integrated magnetic structure for a current-doubler rectifier was introduced, where the transformer secondary winding and secondary inductor windings were integrated, resulting in the removing of the secondary inductor windings with the functionality of the rectifier being guaranteed. Due to introduction of an air gap, the secondary windings not just transform but also store energy. The cores together with the windings integration cause the cost to be reduced and power density to be increased. The reduction of the number of secondary windings and high current interconnections result in lower winding losses. The tight coupling of primary and secondary windings yields minimized leakage inductance.

Another integrated magnetic structure for a current doubler rectifier is disclosed in EP 2 299 456 A1 (DET International Holding Limited). Standardized U/UR cores with bobbinless U/UR cores are used which can be manufactured in high quantities, and therefore manufactured with reduced costs. The tight core-winding coupling yields lower leakage, minimized copper power losses and inductance losses as well as minimized overall thermal resistance. Moreover, the power density increases and the costs are reduced with the absence of bobbins with reduced costs per piece.

The integrated magnetic structures shown in U.S. Pat. No. 6,549,436 (Innovative Technology Licensing LLC), U.S. Pat. No. 6,163,466 (Davila, Jr. et al.), and U.S. Pat. No. 7,034,647 (Northeastern University) comprise four windings: a primary winding, two secondary windings and an additional filter winding which is introduced to further increase the effective inductance and reduce the current ripple in the output of the current-doubler rectifier circuit.

Mostly E cores from retail or sometimes complicated core structures as in U.S. Pat. No. 6,980,077 (ColdWatt, Inc.) are used.

While the described patent addresses some proposed ameliorations, there are still some setbacks. These cores are not flexible in terms of mounting and of adjusting the magnetizing inductance and filtering inductance through the air gap. Also, conventional conductors (round wire and litz) are not adequate for high current secondary windings.

SUMMARY OF THE INVENTION

It is the object of the invention to create an integrated magnetic component pertaining to the technical field initially mentioned, that the losses are further reduced, yielding to higher power density, while on the other hand production costs should be decreased.

The solution of the invention is specified by the features of claim 1. According to the invention the higher current transformer winding and the filter winding comprise at least an edgewise wound winding part.

An edgewise winding is a winding using a conductor having an essentially rectangular cross section with a shorter edge and a longer edge, wherein the conductor is wound around the shorter edge rather than the longer edge. The essentially rectangular cross section allows describes the general shape of the cross section, in particular to distinguish the shape from a round cross section. Therefore, the essentially rectangular cross section may have rounded corners between the shorter and the longer edges. The conductor may for instance be a flat wire.

The outer shape of the edgewise winding may have a circular outer shape, but also a non-circular outer shape, for instance a rectangular outer shape including bend portions. The conductor of the edgewise winding is preferably wound to have a helical shape, wherein one or layers of conductor are stacked along the winding axis. However, in certain cases it may be advantageous to wound the conductor in a spiral shape, resulting in a flat winding.

The edgewise wound winding parts include at least one turn of a rectangular wire. This turn defines an aperture with a smallest extension which is preferably not smaller than twice the width of the wire, wherein the width of the wire is defined by the shorter edge of the wire. The first turn may not be entirely closed, but in any way encloses an angle of at least about 180°.

A magnetic core element is an element made of high permeable material. The magnetic core elements may be used as building blocks, which can be arranged to build the magnetic core structure, forming a common magnetic circuit. A core element might be a leg-core-element or an I-core. A leg-core-element comprises a flange and at least one leg being arranged on a side of the flange where each leg is preferably arranged perpendicularly in relation to the flange. On the contrary, the I-core only comprises a single flange, but no legs. A multi-leg core is a leg-core with at least two legs, wherein the legs are arranged on the same side of the flange. The flanges of the leg-core-elements or the I-cores comprise preferably two parallel surfaces, whereof one of the two surfaces forms the side, where the at least one leg is arranged. If the leg-core-element is a multi-leg-core-element its legs will be are arranged on the side which is defined by said surface.

The magnetic core elements might be considered as abstract building blocks, though preferably they represent constructive building blocks made out of one single piece, preferable out of the same material. However, they also can be assembled from different sub-building blocks, like I-cores. For instance a constructive core element such as a U-shaped core element may be assembled by means of three I-cores, wherein a first I-core represents the flange of the U-shaped core and the two other I-cores represent the two legs of the U-shaped core element, which are arranged on the same side of the first I-core. Likewise, an E-shaped core element might be assembled by four I-cores or a U-shaped core element and an I-core, forming an inner leg. Assembling of the sub-building blocks to a magnetic core element may for instance by achieved by gluing.

In the context of this application linearly stacked means, that the magnetic core elements are serially arranged in a row.

The higher current transformer winding can either be arranged on a primary side of the isolating transformer or a secondary side of the isolating transformer, whereby the isolating transformer transfers power from the primary side to the secondary side due to electromagnetic induction.

By the utilization of edgewise windings a very high fill factor respectively winding factor of the core windings windows can be achieved. The integrated magnetic component can therefore be compact and high power densities can be realized by means of the inventive integrated magnetic component.

By the inventive integrated magnetic component not only I squared R losses (so called copper losses) are reduced; it also yields to reduction of stray inductances and reduction of electromagnetic interference as a consequence of compacter design. The edgewise windings also enable higher automation of production, what allows for reduction of production costs.

The integrated magnetic component is generally adapted for use in DC-DC, AC-DC and DC-AC switched mode power converters. It is particularly adapted for use in switched mode DC-DC power converters. The DC-DC power converter has a converter stage at the input. The converter stage has preferably a double-ended primary topology, as for example, a forward, two-transistor-forward, push-pull, half-bridge or full-bridge converter topology. The integrated magnetic component has further a rectifier stage at the output.

A DC-input power can be applied to a DC-input of the converter stage of the DC-DC voltage converter. The converter stage is capable to convert the DC-input power to an AC-input power which is supplied to the integrated magnetic component and which is associated with a switching signal and therefore switching frequency of the converter stage. The AC-input power is for example attended by a rectangular input voltage. The integrated magnetic component is capable to receive the AC-input power in order to transfer it over the isolating transformer to the rectifier stage at the output of the DC-DC switched mode power converter. The rectifier stage can be partly or entirely integrated in the integrated magnetic component and is adapted to generate a DC-output power at the output of the switched mode power converter. The DC output power preferably provides a DC-output voltage.

The AC-input power which is to be applied to the integrated magnetic component can also be provided directly by a direct AC-AC converter stage. It is also possible to use an additional AC-DC converter stage, upstream to the above-mentioned converter stage, which supplies the DC-input power to the converter stage as an intermediate DC-input power. As AC-DC converter stage for instance a simple passive rectifying circuit or also an active rectifier circuit such as an AC-DC power factor correction (PFC) converter can be used, which provides the intermediate DC-input power. A DC-AC converter stage can be arranged downstream of the rectifier stage, providing an AC-power output. Hence, the integrated magnetic component is suited for AC-AC, DC-AC and AC-DC power conversion.

In a preferred embodiment of the invention, the magnetic core elements of the integrated magnetic component are either leg-core-elements or I-cores, the I-cores comprising a single flange.

Leg-core-elements and I-cores are not only convenient for mass production; they are especially well adapted to be stacked linearly in a way that the magnetic core elements are serially arranged in a row, preferably in a way that the flanges of the magnetic core elements are arranged in parallel. Herein preferably legs of the leg-core-elements are forming at least one row of legs. In such a row two proximate legs are either directly abutting each other, or are separated by a flange and are arranged opposite to each other on both sides of said flange. The legs of said row are preferably arranged along a single axis. It is also preferred that the sides of the flanges have flat and/or parallel surfaces. A part of a core element is considered as to abut another part if an air gap is present in the flux path between the abutting parts. This is however under the condition that the air gap is relatively small compared to the distance between the flanges of the abutting core elements. In this context relatively small is considered to be less than 25% of the distance between the flanges of the abutting core elements. Preferably the magnetic core elements are arranged in way that flanges of the cores are positioned in parallel to each other. It is also preferred that the leg or the legs of the leg-core-elements abut either the flange of the adjacent core element or the leg or the legs of the adjacent leg-core-element in a rectangular angle.

It another preferred embodiment, the magnetic core elements include a first and a second transformer core element and a first filter core element. The transformer core elements are stacked in a way that their flanges and their legs form at least one transformer winding window for receiving turns of the transformer windings. Further, the first filter core element is stacked on the first transformer core element in a way, that the flanges and legs of the first transformer core element and the filter core element form at least one first filter winding window, adapted for receiving turns of the first filter winding.

This arrangement is very convenient as it allows building a magnetic circuit comprising at least two independent magnetic loops with a reduced number of magnetic core elements. Herein the magnetic core structure enclosing the two winding windows defines the two independent magnetic flux loops which either share the flange of the first transformer core element or the first filter core element as a common magnetic flux path. Therefore, the required core material of the integrated magnetic component is reduced.

The lower current transformer winding and the higher current transformer winding are preferably arranged on the legs in a way that their turns pass through the transformer winding window, whereas the first filter winding is preferably arranged in a way that its turns pass through the first filter winding window.

It is to be noted, that in this application, a winding window formed by two magnetic core elements is still considered as a window, if an air gap is arranged in the flux path defined by the two magnetic core elements.

In a further preferred embodiment, a first filter air gap is provided in a flux path between said filter core element and the first transformer core element.

The arrangement of the first filter air gap between said first filter core element and the first transformer core element is well adapted for manufacturing. In case of a multi-leg-core element, air gaps can for instance be obtained by adapting a length of a leg in respect to the other leg respectively to the other legs of the same multi-leg-core element. This normally is achieved by grinding a leg at its free end. Also additive methods might be advantageously applied in certain cases. The first filter air gap may also be provided by inserting a piece of material of low or lower permeability between the first transformer core element and the first filter core element.

If a leg-core-element having only a single leg is used, the magnetic flux generated by the filter winding has its forward path through the single leg, and its return path through the filter air gap whose distance can be defined by the length of the single leg, as this single leg also defines the distance between the flanges of the neighboured magnetic core elements.

Instead or in addition of providing the first filter air gap in a flux path between said first filter core element and the first transformer core element, it can also be integrated in the respective magnetic core element, which might include regions of lower permeability. Such regions can for instance include discrete layers of low permeable material or larger areas of such a material. Also a multitude of smaller air gaps respectively micro-air gaps can be included in the magnetic core element, in order to achieve so called distributed air gaps. Also entire magnetic core elements can be manufactured in a single piece of such a magnetic material. For instance iron powder cores can be manufactured from iron powder.

Optionally, also an air gap could be arranged in a flux path between the first and the second transformer core element, which allows to avoid magnetic saturation of the transformer core elements.

In a particularly preferred embodiment, the integrated magnetic component includes the above-mentioned features in combination:
a) the magnetic core elements of the integrated magnetic component are either leg-core-elements or I-cores, the I-cores comprising a single flange,
b) wherein the magnetic core elements include a first and a second transformer core element and a first filter core element, the core elements being stacked in a way that their flanges and legs form at least one transformer winding window and a first filter winding window, and
c) wherein the first filter air gap is provided in a flux path between said filter core element and the first transformer core element.

However, the features a), b) and c) above can also be realized independently from each other.

In further advantageous embodiment of the invention, the Integrated magnetic component includes a second filter inductor comprising a second filter winding arranged on at least one leg of the magnetic core elements.

By the use of a second filter inductor the performance of the integrated magnetic component can be further increased, in particular more performant rectifier topologies at the output can be realized.

In a further preferred embodiment of the integrated magnetic component a second filter core element is stacked on the first filter core element, or on a side of the second transformer core element, which is opposite to the first transformer core element. The second filter core element and the neighbouring magnetic core element form at least one second filter winding window for receiving turns of the second filter winding. Further, a second filter air gap is provided in a flux path between said second filter core element and the neighbouring core element.

By distributing the filter windings and the air gaps over the two filter core elements, the fringing fields and thus the losses are further reduced. A further advantage of this embodiment is that the integrated magnetic component will have an improved transient response.

In a further advantageous embodiment the integrated magnetic component comprises exactly two filter core elements.

In case of stacking the second filter core element on the first filter core element an electrical connection between the first and the second filter winding becomes shorter. This arrangement simplifies a modularized design and assembly of the circuit. It is in particular advantageous, if two circuit boards are used for connecting the windings: a first circuit board for connecting the higher current transformer windings and a second circuit board for connecting the filter windings.

On the other hand, when arranging the second filter core element on the side of the second transformer core element, a symmetrical arrangement can be achieved, allowing shorter connections between the higher current transformer windings and the filter windings. The symmetrical arrangement is also advantageous for the flux distribution in the magnetic circuit. So both, I squared R (copper) losses and core (iron) losses can be reduced.

In another preferred embodiment, the transformer core elements and the filter core elements are leg-core-elements, wherein the transformer core elements are abutting each other with their legs. Herein the first filter core element preferably abuts the flange of the first transformer core element with its legs, while the second filter core element preferably abuts with its legs either the flange of the second transformer core element or the flange of the second filter core element. This arrangement is preferred as it allows the use of a minimized number of core elements and a simple implementation of air gaps by grinding the legs of the core elements.

Alternatively, the single magnetic core structure may comprise leg-core-elements and I-cores. However, by using leg-core-elements only, the air gaps can be arranged more towards the inside of the magnetic core structure, which signifies lower electromagnetic interference. So the transformer air gap can be arranged between the legs of the opposing transformer core elements. Also the filter air gaps can be arranged towards the flange of the neighboured transformer core element respectively of the neighboured filter core element. Hence, the air gaps are more orientated towards the center of the magnetic core structure.

In another preferred embodiment, the multi-leg core elements are U-cores.

U-cores are standardized magnetic cores which are U- or C-shaped. In the context of this application, the term U-core also includes UR-cores or similar cores. When using U-cores, very simple and compact core structures can be achieved, wherein the amount of required core material is minimized. The use of standardized elements decreases costs of the integrated magnetic component. Two-leg core elements as U-cores are especially beneficial if a high total cross-sectional area of winding conductors and therefore big winding windows are required, as for U-cores the ratio between core materiel and window winding size is optimal.

The legs of the linearly stacked U-cores are building a first and a second row of legs. The windings are preferably either arranged on legs of the first or on the legs of the second row. By mounting the windings in the same row, mounting of the windings including the edgewise wound winding part becomes simpler and a compacter integrated magnetic component can be realized. Preferably the transformer windings are arranged in series on the same leg, to improve coupling.

In another preferred embodiment, wherein the magnetic core elements are three-leg-core-elements, comprising an inner leg and two outer legs. At least one of the three-leg-core-elements forms with a second of the three-leg-core-elements a first transformer winding window and a second transformer winding window for receiving turns of the transformer windings. The windings of the integrated magnetic component are preferably arranged on the inner legs.

The three-leg-core-elements may be standardizes E-shaped cores-elements, which include E-, ER-, EFD-, ETD-, PQ-, PM-, or RM-cores or similar three-leg-core-elements. The use of standardized elements decreases costs of the integrated magnetic component. The different E-shaped core types differ in their geometry. E-cores have the simplest geometry, their flanges and their legs having a rectangular cross section. ER-cores are similar, but their inner legs comprise a round cross-section. ETD-cores also have round inner legs, but their outer legs have concave surfaces which are oriented towards the inner leg. EFD— (Economical Flat Design) cores have a flat design, their legs having an essentially rectangular cross section and their inner leg has a particular flat shape. PQ-, RM- and PM-cores are so called pot core type cores. They comprise a strongly optimized geometry with round inner legs and flanges which are formed to at least partially surround and shield the windings.

By arranging the windings on the inner legs, flux leakage, and therefore losses and electro-magnetic interference are reduced. Also the assembly is simplified if all windings are arranged in the inner legs, where the inner legs are preferably arranged in a row along a common axis. It is also possible, to arrange the windings on both outer legs, or on the outer and the inner legs.

However, by arranging the windings in the same row, mounting of the windings including the edgewise wound winding part becomes simpler and a compacter integrated magnetic component can be realized.

In a further preferred embodiment, the first filter air gap is split in a first and a second part, wherein the first part of the first filter air gap part is arranged between one of the outer legs of the first filter core element and the flange of the first transformer core element, and wherein the second part of the first filter air gap is arranged between the flange of the first transformer core element and the other outer leg of the first filter core element.

It is further preferred, in case a second filter core element is present, that the second filter air gap is split in a first part and a second part, wherein the first part of the second filter air gap is arranged between one of the outer legs of the second filter core element and the flange of the first transformer core element or of the first filter core element. The second part of the second filter air gap is arranged between the other outer leg of the second filter core element and the flange of the first filter core element or of the second transformer core element.

Distributing of the first and/or the second filter air gap over two air gap parts is especially advantageous when an important amount of energy has to be stored in the filter air gaps, respectively if a high amount of power has to be transmitted over the isolation transformer of the integrated magnetic component. Distributing the stored magnetic energy over two air gap parts reduces the total air gap fringing compared to a single air gap having the double length. Furthermore by arranging the air gap parts between the outer legs and the respective flange while the filter winding being arranged on the inner leg, the distance between the air gap and the filter windings is increased and air gap losses decreased.

However, arranging the air gaps on the inner legs reduces electromagnetic interference of the integrated magnetic component.

In a particular embodiment of the invention, the first filter core element is a leg-core-element having a single inner leg, the first filter winding being arranged on said single inner leg, which is abutting the flange of the first transformer core on the side opposite to the inner leg of the first transformer core element.

Moreover, in a further preferred embodiment, where a second filter core element is present, the second filter core element is a leg-core-element having a single inner leg, the second filter winding being arranged on said single inner leg. The single inner leg is abutting the flange of the second transformer core on the side opposite to the inner leg of the second transformer core element or the flange of the first filter core element, on the side opposite to the inner lag of the first filter core element.

The magnetic flux generated by the first filter winding has its forward path through the single inner leg of the first filter core element and the flanges of the first filter core element and the first transformer core element. The first filter air gap is arranged between those flanges, wherein the air gap constitutes the return path of the magnetic flux.

In a preferred embodiment, the single inner leg is arranged towards the center of the flanges and the first filter air gap is divided in two air gap parts, being arranged on both sides of the single leg.

The space between the flanges does not only define the first/second filter air gap, it also constitutes the space for receiving the first/second filter winding turns and is therefore also regarded as winding window in the context of this application, though leaving a side of the window open.

The filter air gaps reaching from one flange to a neighboured flange may be also considered as a special case where a leg is shortened to a length of zero. The transformer winding window and/or the filter winding windows are still considered as windows despite of the opening defining the respective air gap.

In a preferred embodiment the space between the two flanges is at least partly filled with a low-permeable material, mechanically closing the winding window, but leaving space for the filter winding turns. This allows for increasing the mechanical stability of the integrated magnetic component.

By this arrangement a large amount of energy can be stored in the magnetic circuit and be transmitted per cycle of the switched mode power converter, yielding to high power transmission rates, especially in combination with the use of edgewise winding parts.

In a particular advantageous embodiment, the higher current transformer winding and/or the filter windings are adapted for operating currents of more than 10 A, preferably more than 20 A or more than 30 A (RMS).

The edgewise windings are in particular adapted for those operating currents, because high fill-factor of the winding windows can be achieved. It is also possible to use edgewise wound winding parts for smaller currents, however the edgewise wound windings part are especially beneficial for the preferred operating currents. The improvement of the fill-factor by using edgewise windings is reduced when the cross section of the conductors is decreased, because the fraction of isolating material of the conductors in respect to the conductor area increases.

It is particularly preferred, if the higher current transformer winding of the isolating transformer comprises at least a second edgewise wound winding part, the edgewise wound winding parts of the higher current transformer winding, the lower current transformer winding and/or further winding parts of the lower current transformer winding, are arranged in an interleaving manner along the leg(s) of the two transformer cores elements.

By this preferred arrangement, the coupling between the lower current transformer winding and the higher current transformer winding can be increased and leakage flux reduced.

Alternatively the edgewise winding can be arranged in a concentric manner by alternating the edgewise wound winding parts of the higher current transformer winding with (a) winding part (s) of the lower current transformer winding.

In a further preferred embodiment the integrated magnetic component includes at least a second edgewise wound winding part which is either connected in parallel to the edgewise wound winding part of the higher current transformer winding or of one of the filter windings, in order to scale the integrated magnetic component in function of the required operating current.

This allows scaling the transformer windings and/or the filter windings to a specific operating current by increasing the number of the edgewise wound winding part of the higher current transformer winding being connected in parallel, for example to an operating current of 10 A, 20 A or 30 A (RMS).

In other cases it might be advantageous to connect the winding parts of the higher current transformer winding in series, for instance if the voltage ratio has to be adapted.

It is further preferred, that the lower current transformer winding is integrated in a printed circuit board.

By integrating the lower current transformer winding in a printed circuit board, the assembly of the integrated magnetic core element is simplified and better adapted to an automatic assembly process. Through the combination of the edgewise wound winding part(s) of the higher current transformer winding and the printed circuit board integrating the lower current transformer winding, the winding length of the isolation transformer can be kept extraordinary short. As both, the edgewise wound winding part(s) of the higher current transformer winding and the printed circuit board with the lower current transformer winding can abut against each other with flat surfaces, an increased coupling between the higher current transformer winding respectively winding (parts) and the lower current transformer winding can be achieved. Consequently stray losses are reduced. If the lower current transformer winding comprises more than one winding part, the winding parts might be integrated in more than one printed circuit boards, wherein the printed circuit boards and the higher current transformer winding part(s) can be arranged in an interleaved manner.

In a further preferred embodiment at least one of the filter air gaps has a length which is at least 10%, more preferably at least 30%, 50%, 75% or 100% of the length of a distance between the flange of the filter core element and the flange of the magnetic core element being magnetically interconnected by a flux path formed by said filter air gap.

By increasing the length of the filter air gap, the transmitted power of the integrated magnetic component can be increased, without further increasing the operating current of the magnetic component. As larger air gaps can store more energy than small air gaps, more energy can be transmitted per operation cycle period.

A further preferred embodiment of the integrated magnetic component is in particular adapted for use with a current-doubler rectifier. This embodiment includes two magnetic core elements, where the legs of the two magnetic core elements form at least three adjacent winding windows wherein turns of the higher current transformer winding are arranged on at least one of the legs, turns of the lower current transformer winding are arranged on at least one of the legs and turns of the filter winding are arranged on an at least one other leg.

This embodiment is particularly simple to assembly as it requires only two magnetic core elements. By the use of edgewise wound winding parts, even automated assembly is possible. Moreover, this integrated magnetic component still implements three independent magnetic flux loops in a single integrated magnetic component.

Preferably each of the windings can be arranged on more than one leg. A winding can for example be arranged on two abutting legs, which define a flux path between the two magnetic core elements. It is also preferred, that a winding part, for instance an edgewise wound winding part of the higher current transformer winding, is arranged on two abutting legs defining a flux path between the two magnetic core elements. It is further preferred, that the higher current transformer winding comprises a second edgewise wound winding part, wherein the first edgewise wound winding part is arranged on at least one leg arranged in a first flux path between the first and the second magnetic core element, and the second edgewise wound winding part is arranged on at least one leg in a second flux path between the first and the second magnetic core element. Also, the lower current transformer winding preferably comprises a first and a second winding part. Herein preferably the first winding part is arranged on at least one leg which is arranged in the first flux path between the first and the second magnetic core element, and the second winding part is arranged on at least one leg in the second flux path between the first and the second magnetic core element. The first filter winding is preferably arranged on at least on leg which is arranged in a third flux path between the first and the second magnetic core element. The integrated magnetic component further includes a second filter inductor with a second filter winding, which is preferably arranged on at least one leg which is arranged in a fourth flux path between the first and the second magnetic core element.

In a preferred embodiment at least one of the two integrated magnetic components includes a first and a second inner leg and a first and a second outer leg.

Preferably the legs are arranged in parallel on one side of the flange, the inner legs and the flanges forming a transformer winding window, the first outer leg(s), their neighbouring first inner leg(s) and the flanges form a first filter winding window, the second outer leg(s), its neighbouring second inner leg(s) and the flanges form a second filter winding window.

Advantageously, the isolating transformer comprises a second lower current transformer winding and a second higher current transformer winding, and the integrated magnetic component further includes a second filter inductor with a second filter winding. Herein preferably the lower current transformer windings and the higher current transformer windings are arranged on the inner legs and the filter windings on the outer legs of the magnetic core structure.

Hence the transformer winding window receives turns of the lower and higher current transformer windings, the first filter winding window receives turns of the first filter winding and the lower and the higher current transformer winding and the second filter winding window receives turns of the second filter winding and the lower and the higher current transformer winding. This means that the lower current transformer winding and the higher current transformer winding are arranged in way that their turns pass through the transformer winding window, whereas the first filter winding is arranged that its turns pass through the first filter winding window and the second filter winding is arranged that its turns pass through the second filter winding window.

In a further preferred embodiment of the invention, the Integrated magnetic component includes a circuit board, wherein at least one of said edgewise wound winding parts has a first and a second end being oriented in the same direction and being mounted to the circuit board.

By having the first and the second end being directed to the same direction, the circuit and the edgewise wound winding part can be efficiently connected to the circuit board.

Alternatively it is possible to arrange the ends of the edgewise wound winding parts in different, non-parallel directions, for instance in opposite directions. Such an arrangement might be advantageous in certain applications, for instance if the two ends of a winding part are to be connected to distinct circuit boards.

Advantageously the circuit board electrically connects the higher current transformer winding to the filter winding(s).

By using a circuit board, for instance a printed circuit board, for connecting the transformer winding to the filter winding respectively windings, no additional lead out conductors are required, but the edgewise wound winding parts can be connected directly to the circuit board. Consequently no additional soldering points are required, what yields to a reduction of conduction losses. As a result, also heat production is reduced. This also allows for a more compact design of the components.

In addition, the assembly is simplified as the respective edgewise wound winding parts and the circuit board can be pre-assembled to one or more edgewise wound winding modules, hence simplifying production and logistics of production. Moreover, the production of such edgewise wound winding modules, comprising the edgewise wound winding part and the circuit, is particularly adapted for automated production. Those edgewise wound winding modules may be assembled as a whole with the magnetic core structure.

In another preferred embodiment of the invention the integrated magnetic component includes a rectifying circuit comprising at least two rectifying elements, in particular synchronous rectifiers, wherein the rectifying elements being mount on the circuit board, which connects the rectifying elements to the higher current transformer winding of the transformer and to the first filter winding(s).

By integrating the rectifying components in the circuit board the number of connection points can be further reduced and therewith also copper losses. The assembly is further simplified. If higher currents are required a multitude of rectifiers can be connected in parallel on the integrated circuit board to increase the maximum current of the circuit.

Alternatively at least one of the rectifier components can also be integrated in an additional circuit board. This might be advantageous if a high number of rectifying elements is required.

It is particularly preferred that the rectifying elements are surface mounted. The rectifying elements are preferably synchronous rectifiers.

By surface mounting the rectifying elements the required space is reduced and higher power densities can be attained. Also, production costs are reduced, because a high degree of automation can be achieved.

Synchronous rectifiers are active controlled switches. Those switches can for instance comprise metal-oxide-semiconductor field-effect transistors (MOSFETs) or bipolar junction transistors (BJT). Synchronous rectifiers allow for improving the efficiency of rectification. As they have a low on-resistance, they can significantly reduce ohmic losses compared to ordinary semiconductor diodes, in particular, when high currents are present. Moreover, they avoid the voltage drop exhibited by semiconductor diodes in conducting state which is typically 0.7 V for silicon diodes respectively 0.3 V for germanium diodes.

For very high currents, the voltage drop of a synchronous rectifier might exceed the voltage drop of a passive rectifier. In such a case, the use of a passive rectifier such as a diode might be preferable. In particular Schottky-Diodes might be used instead of standard diodes, as they exhibit a voltage drop even below 0.2 V.

Alternatively through hole mounting of the rectifying elements might be used. This is advantageous, if for instance heat sinked rectifying elements are required.

In a further preferred embodiment the circuit board is provided with rectangular through holes for mounting the edgewise wound winding parts, the edgewise wound winding parts being adapted to mechanically support the single magnetic core structure.

By this embodiment it is possible to take advantage of the mechanical stability of edgewise windings. Additional mechanical supports can be neglected and assembly be tremendously simplified, as the integrated magnetic component is supported by means of the at least one circuit board. This also implies that the size and/or the weight of the integrated magnetic component can be further reduced.

In certain cases it might however be preferred to have an additional mechanical support, for instance to further increase mechanical stability, or if a body housing is already present or required. In some cases it also may be advantageous to avoid through holes in the circuit board, for instance to further reduce costs or to adapt the integrated magnetic component to certain assembly techniques.

It is particularly preferred when the rectifying circuit is a current doubler.

The current doubler rectifier circuit is a full wave rectifier circuit which is particularly beneficial when high output currents are required. The higher current transformer winding, which is in this case the secondary winding of the transformer, only has to carry about half of the output current. This allows reducing copper losses. Additionally, only two rectifying elements are required and no center-tap on the secondary side is necessary. Also, heat is distributed over the first and the second filter winding. Further, a finer resolution in the transformer turns ratio is possible compared to a full wave center-tapped rectifier since the two secondaries of the center-tapped rectifier are replaced with a single secondary winding in a current-doubler application. Typically also a lower smoothing capacitance is needed at the output, because of the inductance required for the filter windings.

Alternatively, the rectifying circuit can be a center-tapped rectifier. The center-tapped rectifier also uses two rectifying elements, whereof only one of the rectifying elements causes a voltage drop in the current path and is therefore also adapted for high current application. It typically requires a lower output inductance than the current doubler rectifier, and only needs a single filter winding, which is however preferably split in two parts.

In certain applications, especially if the output voltage has a certain voltage level and the power losses due voltage drops of the rectifying elements are not dominant, also a full-wave bridge rectifier circuit might be advantageously used.

In a further preferred embodiment, the integrated magnetic component is adapted for use with a voltage doubler rectifying circuit. Herein the higher current transformer winding is on the primary side of the isolation transformer, whereas the lower current transformer winding is on the secondary side of the transformer. The integrated magnetic component may also include the rectifying elements and/or the capacitive elements of the voltage doubler rectifying circuit. Those rectifying elements are connected to the secondary side of the isolation transformer whereas the filter winding is adapted to be connected to the primary side of the isolation transformer respectively to the side of the transformer comprising the higher current transformer winding. The integrated magnetic component may also include the circuit board connecting the higher current transformer winding to at least the first filter winding.

Integrated magnetic component according to any of the precedent claims, wherein the edgewise wound winding parts are wound from enamelled flat wire and/or wherein the lower current transformer winding includes triple insulated wire.

By using a triple insulated wire and enamelled flat wire no further isolation layer is required between the primary and the secondary transformer winding respectively between the higher current and the lower current transformer winding. The windings can therefore be arranged in direct contact to each other, what reduces flux leakage and yields to a more compact and more efficient design.

Alternatively, also an extra isolation layer can be arranged between the winding parts of the higher current and the lower current transformer windings. The isolating layer usually comprises an isolation material, or may consist in a mechanical spacer. In this case a simple dual layer isolation for the lower current transformer windings can be used.

The invention further relates to a switched mode power converter, especially a switched mode DC-DC power converter, including an integrated magnetic component according to any of the embodiments mentioned in the description.

The switched mode power converter inherits all of the advantages of the integrated magnetic component mentioned above. The integrated magnetic component is particularly advantageous for switched mode DC-DC converters, or AC-DC respectively converters including a switched DC-DC mode power converter stage.

Other advantageous embodiments and combinations of features come out from the detailed description below and the totality of the claims.

BRIEF DESCRIPTION OF THE DRAWINGS

The drawings used to explain the embodiments show:

FIG. 6a-d are simplified geometrical drawings of the first embodiment of the integrated magnetic component as schematically depicted in FIG. 3. Herein FIG. 6a is an exploded view drawing of the integrated magnetic component, without showing the edgewise wound winding parts being connected to a printed circuit board; FIG. 6b is an isometric view drawing of the same component as depicted in FIG. 6a, however showing the integrated magnetic component in assembled form; FIG. 6c is another isometric view drawing of the integrated magnetic component, now with the printed circuit board 202 and with the rectifying elements D1, D2 in assembled form and FIG. 6d is another representation of the integrated magnetic component of FIG. 6c, but wherein the winding parts are not assembled to the printed circuit board;

FIGS. 9a, 9b are geometrical views of the embodiment schematically depicted in FIG. 8, wherein FIG. 9a is an explosive view of the integrated magnetic component and FIG. 9b is a view of the same component, however in assembled form; the printed circuit board not being shown;

FIG. 14a, bare geometrical views of the embodiment schematically depicted in FIG. 13, wherein the integrated magnetic component comprises three-leg-core-elements; FIG. 14a is an explosive view of the integrated magnetic component and FIG. 14b is a view of the same component, however in assembled form; the printed circuit board not being shown;

FIGS. 15a, 15b are geometrical views of another embodiment of the invention. This embodiment is similar to the embodiment shown in FIGS. 14a and 14b, but wherein the lower current winding is implemented by a printed circuit board;

FIG. 16b schematically shows a first variation of the magnetic core structure depicted in FIG. 16a;

FIG. 16c schematically shows a second variation of the magnetic core structure depicted in FIG. 16a;

FIGS. 18a and 18b are geometrical views of the embodiment schematically depicted in FIG. 17, wherein FIG. 17a is an explosive view of the integrated magnetic component and FIG. 17b is a view of the same component, however in assembled form; the printed circuit board not being shown;

In the figures, the same components are given the same reference symbols. Similar elements of different embodiments are denoted by similar reference numerals differing by the hundreds digit if they are depicted in different drawings.

PREFERRED EMBODIMENTS

Figure 1:
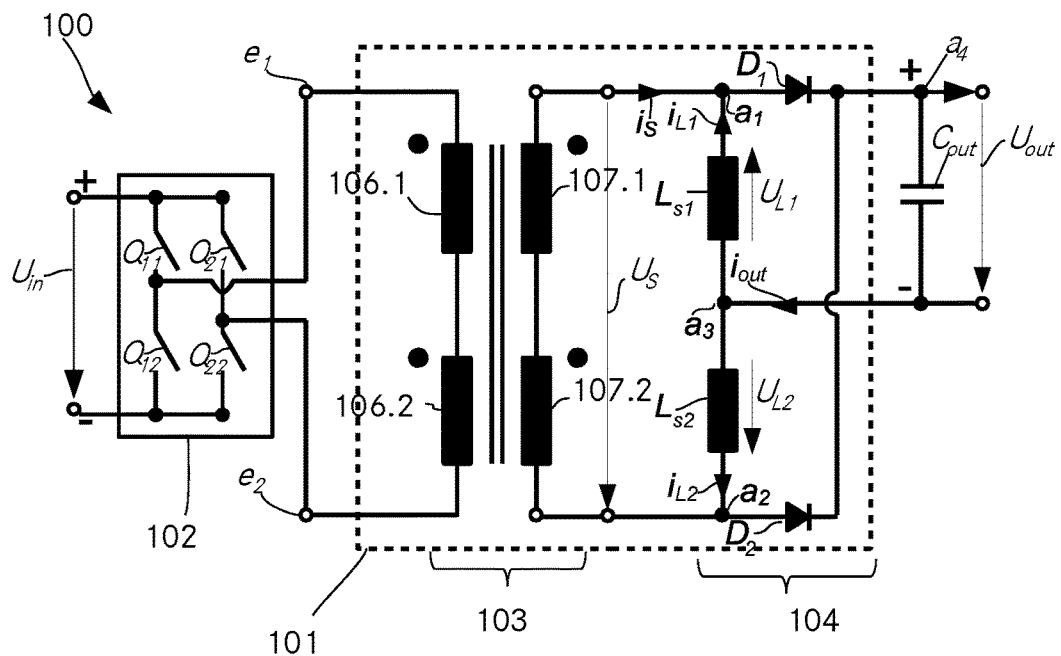
FIG. 1 illustrates the circuit configuration of the inventive DC-DC switched mode power converter with current-doubler rectifier according to the invention.

The integrated magnetic component 101 according to the invention is integrated in the circuit configuration shown in FIG. 1, a switched mode DC-DC power converter 100 which transfers power with a higher DC input voltage Uin to a lower DC output voltage Uout. The switched mode DC-DC power converter 1 comprises a converter stage 102, an isolation transformer 103 and current doubler rectifier stage 104. The converter stage 102 is a full-bridge converter comprising four switches Q11, Q12, Q21, and Q22. It however can be replaced by other converter types, having a different double-ended primary topology, such as a forward, a two transistors-forward, a push-pull and a half bridge converter topology. The converter stage 102 is connected across a first and a second input terminal e1 and e2 to a primary side of the isolation transformer 103, which comprises a lower current transformer winding being split in a first lower current transformer winding part 106.1 and second lower current transformer winding part 106.2, both being connected in series. The isolation transformer 103 further comprises on its secondary side a higher current transformer winding, which is split in a first higher current transformer winding part 107.1 and a second higher transformer winding part 107.2, both are also connected in series. The higher current transformer winding parts 107.1 and 107.2 are realized as edgewise wound winding parts.

The current doubler rectifier stage 104 on the output of the switched mode DC-DC power converter 100 includes a first diode D1 and a second diode D2 as rectifying elements, and two identical but individual filter inductors, namely the first filter inductor Ls1 and the second filter inductor Ls2. The filter inductors Ls1 and Ls2 are realized by means of a first filter winding and a second filter winding, where both windings comprise at least an edgewise wound winding part. The diodes D1 and D2 have been chosen as rectifying elements in the circuit diagram for better comprehensibility. Instead of the diodes D1 and D2, such as Schottky-Diodes or Bipolar Junction Diodes, also other rectifying elements can be used. In particularly useful are active switches respectively synchronous rectifiers, such as transistors, usually power MOSFETs or power BJTs.

The two filter inductors Ls1 and Ls2 are connected in a common filter connection point a3 in series in respect to each other. They are further connected in parallel to the higher current transformer winding, comprising the first and the second higher current transformer winding parts 107.1 and 107.2. In a first filter connection point a1, the first filter inductor Ls1 is connected to a free end of the first higher current transformer winding part 107.1 and also to the anode of the first diode D1. Likewise, the second filter inductor Ls2 is connected in a second filter connection point a2 to a free end of the second higher current transformer winding part 107.2 and to the anode of the second Diode D2. Both diodes D1 and D2 are connected in an output connection point a4 with their cathodes to a terminal of an output capacitor Cout. This output capacitor Cout is connected with the other terminal to the common filter connection point a3 to both filter inductors Ls1 and Ls2.

The inductive components of the isolating transformer 103, namely the lower current transformer winding parts 106.1 and 106.2 and the higher current transformer winding parts 107.1 and 107.2, and the filter inductors Ls1 and Ls2 are all integrated by a single integrated magnetic component 101. In this particular embodiment, also the diodes are part of the integrated magnetic component 101. They could however also been arranged outside of the integrated magnetic component. It is to be mentioned, that also the output capacitor Cout could be part of the integrated magnetic component 101.

Figure 2:
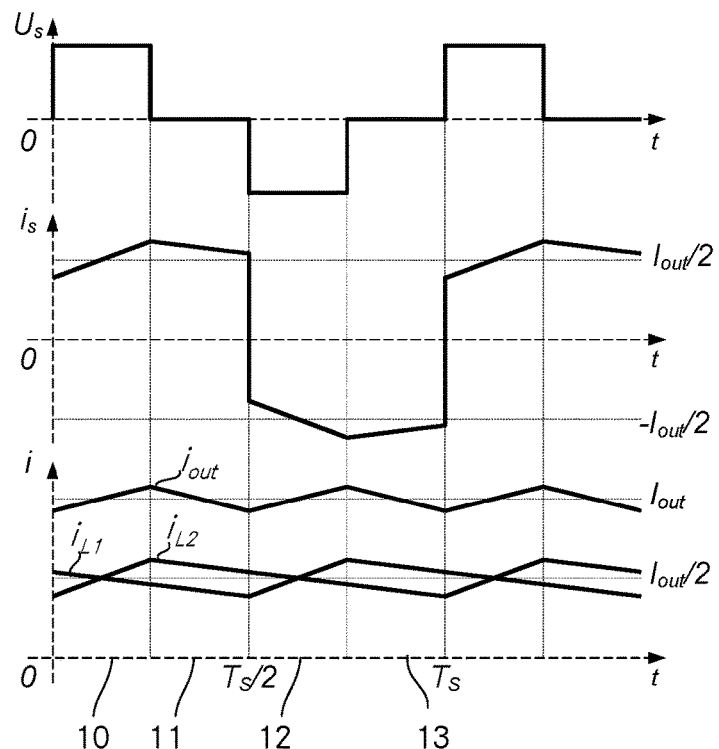
FIG. 2 illustrates current waveforms of currents in the higher current winding parts of isolation transformer, in the filter windings and the output current for a DC-DC switched mode power converter with current-doubler rectifier according to FIG. 1.

The diagram in FIG. 2 shows the waveforms of the switched mode DC-DC converter 100 (FIG. 1), for the secondary voltage Us across the filter connection points a1 and a2, the secondary transformer current Is (see also FIG. 1), which is the current through the higher current transformer winding parts 107.1 and 107.2, and the filter currents iL1 and iL2 through the filter inductors Ls1 and Ls2 as well as the output current iout, which is the sum of the filter currents iL1 and iL2. The waveforms are shown for a little bit more than an operation cycle period Ts, which is typically in the range of some µs, e.g. 10 µs, the switching frequency being around and above 100 kHz.

Over the whole operation cycle period Ts the filter currents iL1 and iL2 and consequently the output current Iout, being their sum, always have the same direction, albeit the transformer current is changing its sign after half of the operation cycle period Ts. In a first time interval 10, until Ts/4, the secondary voltage Us is positive. During this period the first diode D1 is forward biased while the second diode D2 is blocked by the secondary voltage Us. Consequently the current path of the first filter current iL1 runs through Ls1, the first diode D1 and the output capacitor Uout. Because the first filter voltage UL1 applied to the first filter inductor Ls1 is negative, the first filter current iL1 through the first filter inductor Ls1 decreases. On the other hand, the second diode D2 is blocked, thus the second filter current iL2 flows through the second filter inductor Ls2, the higher current transformer winding parts 107.1 and 107.2, the first diode D1 and the output capacitor Cout. As the second filter voltage UL2 through the second filter inductor Ls2 is positive, the current through the second filter inductor Ls2 increases. Hence only the second filter current il2 through the second filter inductor Ls2 flows in this cycle through the transformer. In the second time interval 11, until Ts/2, the secondary voltage Us is 0V. This will yield that not only that the second filter current ils2 through the first filter inductor Ls1 will further decrease, but also the first filter current iLs1 through the second filter inductor Ls2, because the second filter voltage UL2 across the second filter inductor Ls2 will now become negative, equal to the output voltage Uout. In the same time interval also, only the second filter current iLs 2 will flow through the higher current transformer winding parts 107.1 and 107.2. In the third time interval 12, until ¾ Ts, the secondary voltage Us becomes negative, yielding to similar conditions as in the first interval of the cycle, but with changed signs. Now, the first diode D1 will be turned off and the second diode D2 turned on. The current through the higher current winding of the transformer Is now rapidly changes its direction and is equal to the first filter current iL1, while the second filter current iL2 now flows through the diode D2 and keeps decreasing. In the fourth time interval 13, until Ts, the secondary voltage Us is turned off again, yielding that both filter currents are decreasing, before a next cycle starts again with a positive secondary voltage Us.

Consequently, the transformer only carries one of the filter currents iL1 and iL2, and consequently only approximately half of the output current iout, being the sum of both currents. The filter currents iL1, iL2 having a 180° phase shift.

Figure 3:
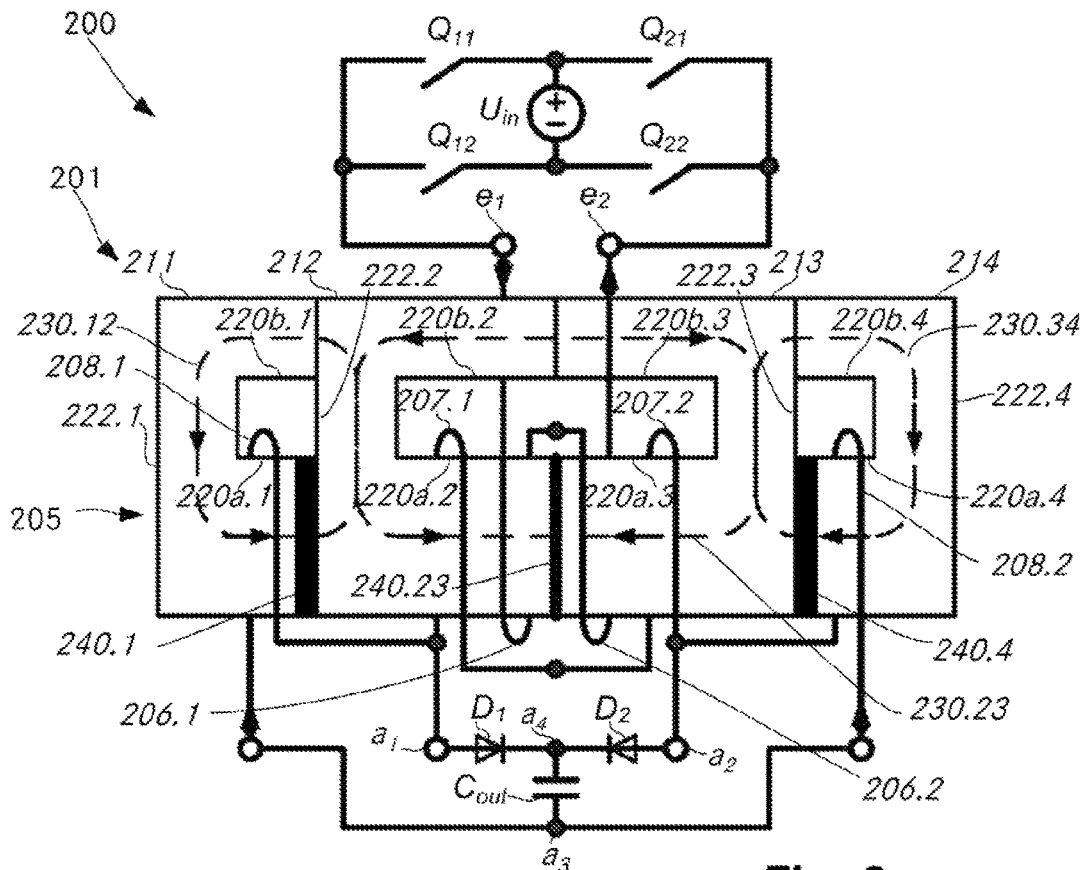
FIG. 3 illustrates a first embodiment of the integrated magnetic component according to the invention, implemented in a DC-DC switched mode power converter with a current-doubler rectifier, the integrated magnetic component comprising U-shaped core elements.

FIG. 3 schematically shows a first embodiment of the integrated magnetic component 201 according to the invention, which is integrated in a switched mode DC-DC power converter 200 and which is implementing the electrical circuit shown in FIG. 1.

The integrated magnetic component 201 comprises a single magnetic core structure 205 with four linearly stacked U-shaped core elements: A first transformer core element 212, a second transformer core element 213, a first filter core element 211 and a second filter core element 214.

Each of said core elements 211, 212, 213, and 214 comprises a first outer leg 220a, a second outer leg 220b and a flange 222. The two transformer core elements 212 and 213 are facing each other with their first outer legs 220a.2, 220a.3 and their second outer legs 220b.2, 220b.3 and form an O-like shaped transformer core section having a window like opening which provides a transformer winding window for receiving turns of a first and a second lower current transformer winding part 206.1, 206.2 and of a first and a second higher current transformer winding part 207.1, 207.2. The higher current transformer winding parts 207.1, 207.2 and the lower current transformer winding parts 206.1, 206.2 are forming the isolating transformer of the switched mode DC-DC power converter 200, corresponding to the isolation transformer 103 in the schematic electrical drawing according to FIG. 1. The higher current transformer winding parts 207.1, 207.2 and the lower current transformer winding parts 206.1, 206.2 are arranged on the first outer legs 220a.2 and 220a.3 of the transformer core elements 212, 213 in a sandwich-like manner, in a way that the lower current transformer winding parts 206.1, 206.2 are arranged between the higher current transformer winding parts 207.1, 207.2. The higher current transformer winding parts 207.1, 207.2 are realized as edgewise wound winding parts, allowing them to support a high current.

The two-dimensional representation of the magnetic circuit of the magnetic core structure 205 in FIG. 3 has to be understood symbolically. The width of respective core sections along the flux paths, depicted in dashed lines, represents the cross section of a respective core section. For instance, in FIG. 3 the first outer legs 220a.1-220a.4 have a larger cross section than the second outer legs 220b.1-220b.4.

In its simplest form, the four U-shaped core elements 211-214 depicted in FIG. 3 may be standardized U-cores, having the form of a right prism, with a basic shape having the form of a U as depicted, and where the legs of the U-cores have a basically rectangular cross section.

A relatively short transformer air gap 240.23 is arranged between the first two outer legs 220a.2, 220a.3 of the first transformer core element 212 and the second transformer core element 213. This transformer air gap 240.23 reduces negative influences due to variation in permeability of the core material, which is typically ferrite. The permeability of ferrite may vary up to 30% from one batch to another batch. The relatively short transformer air gap 240.23 also allows for defining the magnetizing current. It further permits avoiding saturation of the core material, in order that the integrated magnetic component can be operated in the linear range of the core magnetization characteristic of the core material.

The first filter core element 211 is stacked on the flange 222.2 of the first transformer core element 212, such that its first outer leg 220a.1 and its second outer leg 220b.1 are abutting the flange 222.2 of the first transformer core element 212 on the side opposite to the outer legs 220a.2, 220b.2 of the first transformer core element 212. The neighboring core elements 211 and 212 define a window like opening for receiving winding turns of the first filter winding 208.1 which is arranged on the first outer leg 220a.1 of the first filter core element 211 and defines together with the magnetic core structure 205 the inductance of the first filter inductor Ls1 (FIG. 1). A first filter air gap 240.1 is placed between the flange 222.2 of the first transformer core element 212 and the first outer leg 220a.1 of the first filter core element 211.

The second filter core element 214 is stacked on the flange 222.3 of the second transformer core element 213, such that its first outer leg 220a.4 and its second outer leg 220b.4 are abutting the flange 222.3 of the second transformer core element 213 on the side opposite to the outer legs 220a.3, 220b.3 of the second transformer core element 213. A second filter air gap 240.4 is placed between the flange 222.3 of the second transformer core element 213 and the first outer leg 220a.4 of the second filter core element 214. The neighboring core elements 213 and 214 define a window like opening which provides a second filter winding window for receiving winding turns of the second filter winding 208.2 which is arranged on the first leg 220a.4 of the second filter core element 214. The second filter winding 208.2 and the magnetic core structure 205 define the inductance of the second filter inductor Ls2 (FIG. 1).

The air gaps 240a.1, 240a.4, 240a.23 can be achieved by grinding the respective first outer leg 220a.1, 220a.2, 220a.3 or 220a.4. They may be filled with air or any other material of low magnetic permeability.

In FIG. 3 also the three independent magnetic paths of the integrated magnetic component 201 are depicted in dashed lines, each of which runs around one of the three winding windows:
a) A transformer flux path 230.23 through the transformer core elements 212 and 213 around the transformer winding window.
b) A first filter flux path 230.12 around the first filter winding window through the first filter core element 211 and the flange 222.2 of the first transformer core element 212;
c) A second filter flux path 230.34 around the second filter winding window, through the second filter core element 214 and the flange 220.3 of the second transformer core element 213.

Herein the first filter flux path 230.12 and the transformer flux path 230.23 share the flange 222.2 of the first transformer core element 212, whereas, the second filter flux path 230.34 and the transformer flux path 230.23 share the flange 222.3 of the second transformer core element 213. Therefore, the core material of the integrated magnetic component is reduced.

The first lower current transformer winding part 206.1, the second lower current transformer winding part 206.2, the first higher current transformer winding part 207.1 and the second higher current transformer winding part 207.2 are all arranged on one of the outer legs of both transformer core elements 212 and 213, namely around the first outer leg 220a.2 of the first transformer core element 212 and/or the first outer leg 220a.3 of the second transformer core element 213.

The lower current transformer winding parts 206.1 and 206.2 are connected in series. The free end of the first lower current transformer winding part 206.1 represents a first input terminal e1 of the integrated magnetic component 201 and the free end of the second lower current transformer winding part 206.2 represents the second input terminal e2 of the integrated magnetic component 201.

Upstream of the integrated magnetic component 201, the switched mode DC-DC power converter comprises a full-bridge converter with a switch network of four switches Q11, Q12, Q21 and Q22. The switch network provides a square voltage output between the first and second input connection point e1 and e2 of the integrated magnetic component from a DC input voltage Uin. The DC input voltage Uin may be provided by a rectifying circuit, such as an AC/DC power factor correction (PFC) converter. Instead of a full-bridge converter with a switch network of four switches a half-bridge rectifier with two switches can also be used.

The higher current transformer windings 207.1, 207.2 are also connected in series, the first and the second higher current windings 207.1, 207.2 of the transformer having the same winding direction.

The switched mode DC-DC power converter 200 has a similar current-doubler rectifier stage as depicted in circuit diagram depicted in FIG. 1. It comprises a first diode D1 and a second Diode D2 as rectifying elements and the first and the second filter winding 208.1 and 208.2.

The first and the second filter windings 208.1 and 208.2 are connected in series, sharing a common connection point a3 together with the output capacitor Cout. In a first filter connection point a1, the first filter winding 208.1 is connected to a free end of the first higher current transformer winding part 207.1 and also to the anode of the first diode D1. In a second filter connection point a2, the second filter winding 208.2 is connected to a free end of the second higher current transformer winding part 207.2 and also to the anode of the second diode D2. Both diodes are connected with their cathodes in an output connection point a4 to the free terminal of the output capacitor Cout. The output connection point a4 and the common connection point a3 are forming the output of the integrated magnetic component 205.

The first filter inductance Ls1 of the circuit is defined by the first filter winding 208.1 wound around the first outer leg 220a.1 of the first filter core element 211 and the first filter air gap 240.1 between the first outer leg 220a.1 and the flange 222.2 of the first transformer core element 212.

Similarly, the second filter inductance Ls2 of the circuit is defined by the second filter winding 208.2 wound around the first outer leg 220a.4 of the second filter core element 214 and the second filter air gap 240.4 between the first outer leg 220a.4 of the second filter core element 214 and the flange 222.3 of the second transformer core element 213.

Figure 4:
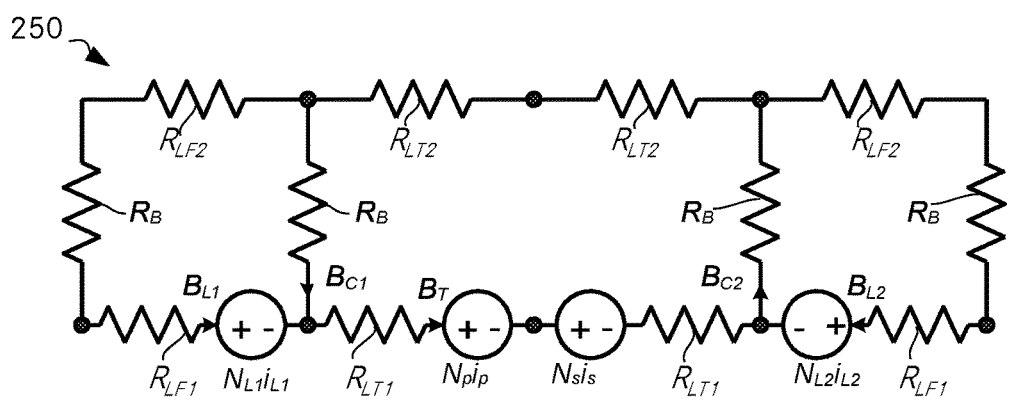
FIG. 4 shows a reluctance model of the magnetic core structure of the integrated magnetic component according to FIG. 3.

FIG. 4 shows a reluctance model 250 of the magnetic core structure 205 according to the embodiment shown in FIG. 3. The flanges 222.1, 222.2, 222.3, 222.4 of all four core elements 211, 212, 213 and 214 are considered to be identical and are represented by a flange reluctance $R_B$. The filter core elements 211 and 214 are considered to be identical and hence also their first outer legs 220a.1, 220a.4 and their second outer legs 220b.1, 220b.4. $R_{LF1}$ designates the reluctance of the first outer legs 220a.1, 220a.4 and $R_{LF2}$ designates the reluctance of the second outer legs 220b.1, 220b.4 of the filter core elements 211, 214. IL1 designates the first filter current through the first filter winding and IL2 the second filter current through the second filter winding.

Also, the transformer core elements 212 and 213 are considered to be identical. Therefore, their first outer legs 220a.2, 220a.3 and the second outer legs 220b.2, 220b.3 are considered to be identical. $R_{LT1}$ designates the reluctance of the first outer legs 220a.2, 220a.3 and $R_{LT2}$ is the reluctance of each of its second outer legs 220b.2, 220b.3, including a portion of the air gap 240.23 in the flux path between the first and the second transformer core element U2, U3. The currents through the first lower transformer winding part 206.1 and the second lower current transformer winding part 206.2 are considered to be the same and are designated as current $i_P$. Likewise, the currents through the first higher current transformer winding part 207.1 and the second higher current transformer winding part 207.2 are considered to be the same and are designated as current $i_s$.

Windings turn numbers are: for the first filter winding $N_{L1}$, for the second filter winding $N_{L2}$, $N_P$ the sum of the winding turns of both lower current transformer winding parts 206.1 and 206.2 and $N_S$ the sum of the winding turns for the higher current transformer winding parts 207.1 and 207.2. $N_{L1}$ and $N_{L2}$ are considered equal: $N_{L1}=N_{L2}=N_L$.

Figure 5:
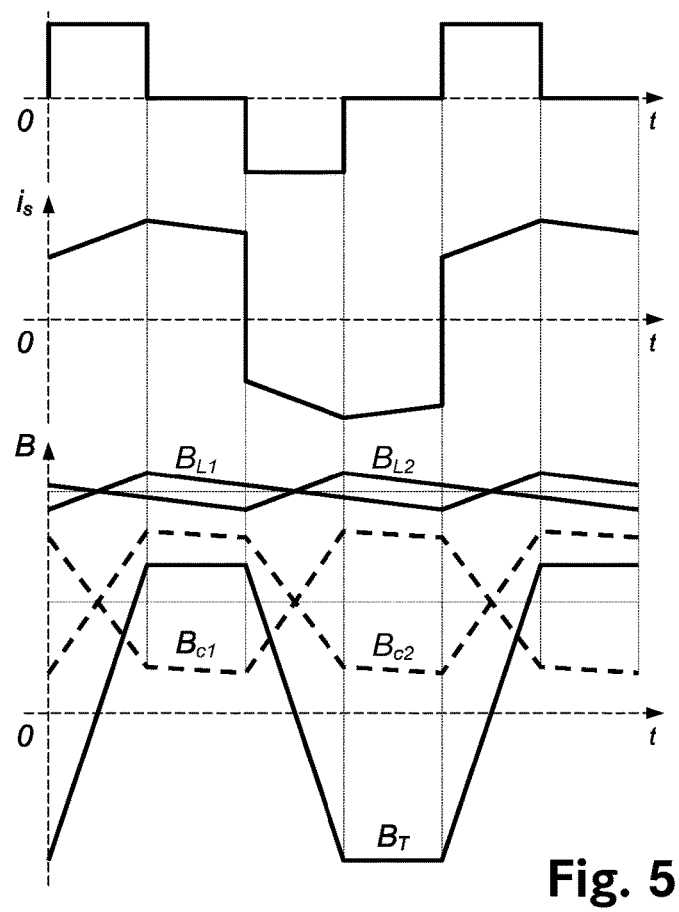
FIG. 5 illustrates the waveforms of the different magnetic flux densities in the magnetic core structure according to FIG. 3, the waveforms of the magnetic flux densities corresponding to the current waveforms shown in FIG. 2.

In FIG. 5 the waveforms of the different magnetic flux densities in the magnetic core structure 205 are depicted: Those magnetic flux densities waveforms correspond to the current waveforms shown in FIG. 2. The fluxes are determined by applying the reluctance model 250 of the current doubler converter according to FIG. 4. The magnetic flux density BL1 is the magnetic flux through the reluctance $R_{LF1}$ (FIG. 4) and the magnetic flux density BL2 is the magnetic flux density through the reluctance $R_{LF2}$ (FIG. 4). Those magnetic flux densities BL1 and BL2 do not change sign during an operating cycle and are essentially proportional to the first filter current iL1 and the second filter current il2, respectively. In contrast to those filter flux densities BL1 and BL2 the magnetic flux density Bt through the reluctance $R_{LT1}$ (FIG. 4) of the first transformer outer legs 220a.2 and 220a.3, changes sign, as it depends mainly on the voltage present at the terminals of the transformer. The magnetic flux densities Bc1 and Bc2 in the flanges 222.2 and 222.3 result from the sum of the first filter flux 230.12 and the transformer flux 230.23 respectively the second filter flux 230.34 and the transformer flux 230.23 in the common transformer flanges 222.2 and 222.3 (FIG. 3). As it is seen, the respective filter flux and the transformer flux are partially compensating each other in the common transformer flanges 222.2 and 222.3, thus reducing losses in those flanges.

In FIGS. 6a-6d different simplified geometrical views of the first embodiment of the integrated magnetic component 201 are shown. FIG. 6a is an explosive view of the integrated magnetic component 201 without the printed circuit board and without diodes. FIG. 6b is an isometric view of the same component, however in assembled form. FIG. 6c is an isometric view of the integrated magnetic component 205 of FIG. 6c, but showing also the printed circuit board 206. FIG. 6d is another isometric view of the integrated magnetic component, also with the printed circuit board 206, however the edgewise wound winding parts not being mounted on the printed circuit board 206.

The integrated magnetic component comprises four stacked U-shaped core elements 211-214, as already depicted in FIG. 2. The U-shaped core elements of this embodiment are U-cores which are optimized for use with edgewise wound winding parts. The flanges 222.1-222.4 of the U-cores have the form of a right prism with a base area 260 which is composed by a juxtaposition of a rectangular section 261, an isosceles trapezoidal section 262 and a semi round section 263. Herein the longer baseline of the isosceles trapezoid 262 is one of the longitudinal sides of the rectangular section 261 and the shorter baseline of the isosceles trapezoid the straight side of the semi round section 263. The first outer legs 220a.1-220a.4 of the four U-cores 211-214 have a cylindrical shape and are adapted for receiving windings respectively winding parts with a circular inner diameter. Those first outer legs 220a.1-220a.4 are arranged on the respective semi round part of base area of the respective flanges 222.1-222.4. Parallel to the first outer legs, the second outer legs 220a.1-220a.4 are arranged on the respective rectangular section 261 of the base area 260 of the respective flange, the second outer legs 220b.1-220b.4 having a rectangular cross section. The first outer legs 220a.1-220a.4 respectively the cylindrical outer legs are a little bit shorter than the second outer legs 220b.1-220b.4. This difference defines the length of the first and second filter air gaps 240.1, 240.4 and the transformer air gap 240.23 (see FIG. 2). For increasing stability the air gaps might be filled with a non-respectively a low-permeable material.

The U-shaped core elements 211-214 are preferable made out of a single piece of a ferrite material. However, they might also be assembled by different parts of ferrite and also out of different materials having a different permeability.

The first and the second filter winding 208.1 and 208.2 and the first and the second higher current transformer winding parts 207.1 and 207.2 are edgewise wound winding parts. The lower current transformer winding parts 206.1, 206.2 in this embodiment include conventional windings with bobbins and arranged next two each other on the first outer legs 220a.2 and 220a.3 of the transformer core elements 212 and 213. The first higher current transformer winding part 207.1 is arranged on the first outer leg 220a.2 of the first transformer core element 212, between the flange 222.2 of the first transformer core element U2 and the first lower current transformer winding part 206.1. The second higher current transformer winding part 207.2 is arranged on the first outer leg 220a.3 of the second transformer core element 213, between the flange 222.3 of the second transformer core element and the second lower current transformer winding part 206.2.

Each of those winding parts comprises a flat wire which is wound around its shorter edge to a circular helix, the inner smaller edge of the flat wire defining a circular aperture and the outer smaller edge of the flat wire defining a circular outer shape. Each of the edgewise wound winding parts 207.1, 207.2, 208.1, 208.2 further comprises two straight free ends 243a and 243b which are arranged parallel to each other. The flat wire is preferable enamelled, electrically isolating two neighboured turns of the same winding part, having a relatively low voltage difference. The enamelled isolation also serves as isolation layer in respect to the lower current transformer winding parts 206.1 and 206.2, which are preferable triple isolated, so that in total four isolation layers separate the lower current transformer winding parts 206.1 and 206.2 from neighboured higher current transformer winding parts 207.1 and 207.2.

The higher current transformer winding parts 207.1 and 207.2 and the filter windings 208.1 and 208.2 are mounted on the printed circuit board 206. For this purpose, the printed circuit board 206 comprises rectangular through holes 245 which receive the free ends of the respective windings for being soldered to the printed circuit board 206. Because of the mechanical stability of the edgewise wound winding parts, the entire magnetic core structure including the windings are supported by the printed circuit board, wherefore no particular mechanical support has to be provided. The integrated magnetic component further implements the diodes D1 and D2 as rectifying elements of the current doubler stage (104, FIG. 1). In order to increase the current capacity of the diodes, the first diode D1 is implemented by a quadruplet of four single diodes D1' respectively and the second diode D2 by another quadruplet of four other single diodes D2', wherein the diodes in each quadruplet are electrically arranged in parallel and surface mounted on the printed circuit board 206. Instead of diodes also other rectifying elements could be used, as mentioned above.

The surface mounted arrangement of the electrical component, here the diodes D1 and D2 on the printed circuit board 206, allows an even more compact design of the integrated magnetic component 201.

The printed circuit boards 206 also provides for the electrical connections between the higher current transformer winding parts 207.1, 207.2 and the transformer winding parts 208.1, 208.2. With the above arrangement high DC output currents of 30 A-200 A at 12 V DC can be achieved at a switching frequency of the switched mode DC-DC power converter of around 100 kHz.

Figure 7A:
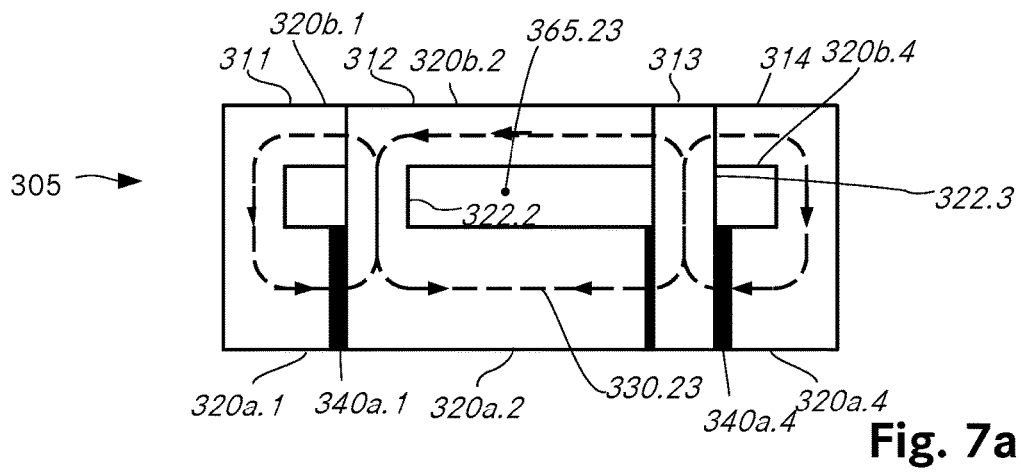
FIG. 7a schematically shows a first variation of the magnetic core structure depicted in FIG. 3.

The magnetic core structure 305 shown in FIG. 7a is a variation of the magnetic core structure 205 according to the first embodiment of the integrated magnetic component (FIGS. 3-6). However, in the magnetic core structure 305 the transformer winding window defining the transformer flux path 330.23 is formed by a first U-shaped transformer core element 312 and a second transformer core element 313, which is an I-core. The filter core elements 311 and 314 are similar to the ones of the magnetic core structure 205 of the first embodiment (FIGS. 3-6).

The first transformer core element 312 comprises a first outer leg 320a.2, a second outer leg 320b.2 and a flange 322.2, whereas the second transformer core element 313 is an I-core having a flange 322.3, but no legs. The first transformer core element 312 is abutting the flange 322.3 of the second transformer core element with its outer legs 320a.2 and 320b.2 to form the O-shaped transformer core section. The second filter core element 314 is abutting with its outer legs 320a.4 and 320b.4 the flange 322.3 of the second transformer core element 313 on the side opposite to the outer legs 320a.2 and 320b.2 of the first transformer core element. Likewise, the first filter core element 311 is abutting with its outer legs 320a.1 and 320b.1 the flange 322.2 of the first transformer core element 312 on the side opposite to the outer legs 320a.2 and 320b.2 of the first transformer core element 312. As in the first embodiment, the first filter air gap 340.1 is placed between the flange 322.2 of the first transformer core element 312 and the first outer leg 320a.1 of the first filter core element 311. A second filter air gap 340.4 is arranged between the flange 322.3 of the second transformer core element 313 and the first outer leg 320a.4 of the second filter core element 314. However, the transformer air gap 340.23 is arranged between the first outer leg 320a.2 of the first transformer core element 312 and the flange 322.3 of the second transformer core element 313.

Figure 7B:
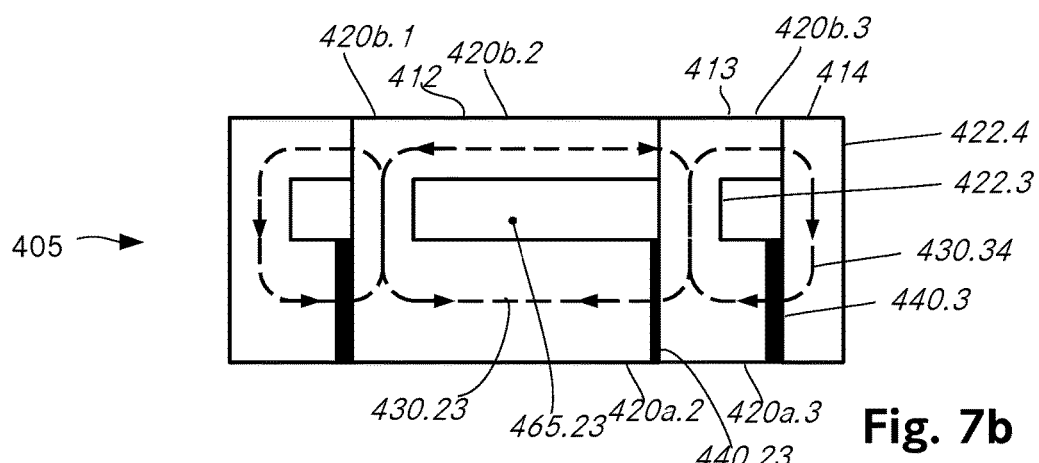
FIG. 7b schematically shows a second variation of the magnetic core structure depicted in FIG. 3.

The magnetic core structure 405 shown in FIG. 7b is also similar to the magnetic core structure 205 of the first embodiment shown in FIG. 3. However, the O-shaped transformer core section, defining the transformer flux path 430.23 respectively the transformer winding window 465.23 for receiving the transformer winding turns, is formed by the first transformer core element 412 being a U-shaped core element and a flange 422.3 of a second transformer core element 413, also being a U-shaped core element. The transformer air gap 440.23 is arranged between the first outer leg 420a.2 of the first transformer core element 412 and the flange 422.3 of the second transformer core element 413.

The second filter flux path is defined by the flange of the second transformer core element 422.3, the outer legs 420a.3 and 420b.3 of the second transformer core element 413 and the flange 422.4 of the second filter core element 414 being an I-core. The second filter air gap 440.3 is arranged between the first outer leg 420a.3 of the second transformer core element 413 and the flange 422.4 of the second filter core element 414.

Figure 8:
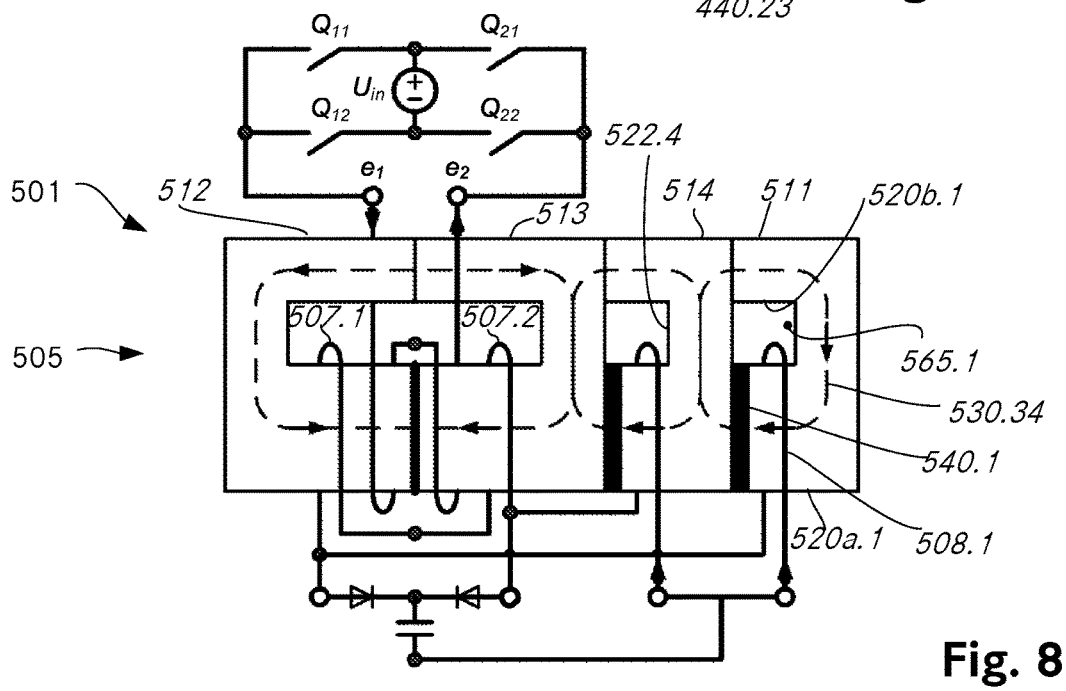
FIG. 8 illustrated another embodiment of the integrated magnetic component according to the invention; the integrated magnetic component comprising U-shaped core elements, where filter core elements are stacked together.

The embodiment of the integrated magnetic component 501 shown in FIG. 8 is similar to the integrated magnetic component 201 depicted in FIG. 3. The magnetic core structure 505 of this embodiment also comprises two U-shaped transformer core elements 512 and 513 and two U-shaped filter core elements 511 and 514. However, in this embodiment the first filter core element 511 is stacked on the flange 522.4 of the second filter core element 514, wherein the outer legs 520a.1 and 520b.1 of the first filter core element 511 are abutting the flange 522.4 of the second filter core element 514 in a way that the flange 522.4 of the second filter core element 514 and the first filter core element 511 define a first filter flux path 530.34 and form a first filter winding window 565.1 for receiving the turns of the first filter winding 508.1. The first filter air gap 540.1 is arranged between the first outer leg 520a.1 of the first filter core element 511 and the flange 522.4 of the second filter core element 514.

Figure 9A:
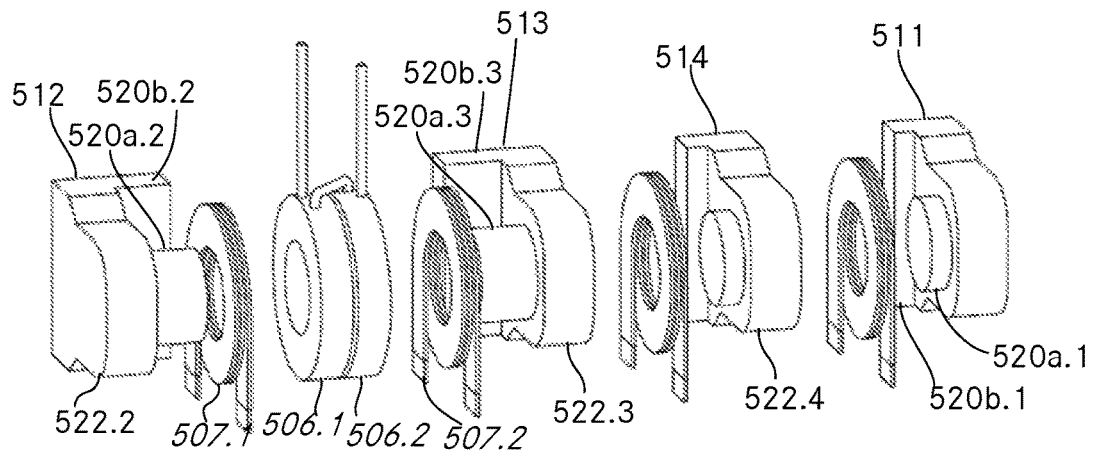
Figure 9B:
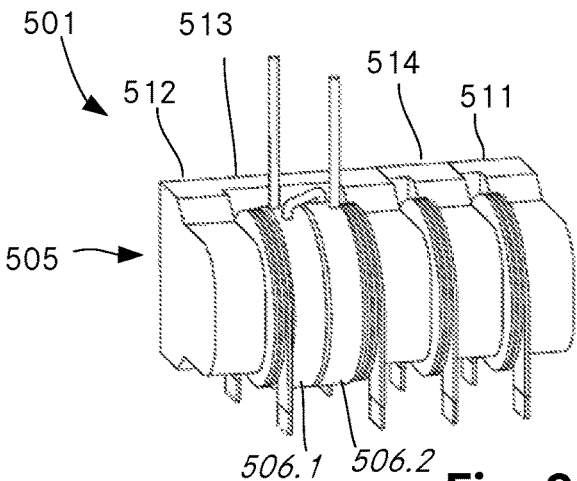

FIGS. 9a and 9b are geometrical views of the embodiment schematically depicted in FIG. 8, wherein FIG. 9a is an explosive view of the integrated magnetic component 501 and FIG. 9b is a view of the same component, however in assembled form. The printed circuit board is not shown. The core elements of the magnetic core structure, namely the first and the second transformer core elements 512 and 513 and the first and second filter core elements 511 and 514 are similar to the core elements 211, 212, 214 and 214, shown in FIGS. 6a-6d. Also winding parts are similar to the ones shown in FIGS. 6a-6d.

In the magnetic core structure 505 of the integrated magnetic component 501, the first filter core element 511 is stacked with its first and second outer leg 520a.1, 520b.1 on the flange 522.4 of the second filter core element 514, which itself is stacked with its legs to the flange 522.3 of the second transformer core element 513. The first transformer core element 512 and the second transformer core element 513 are abutting each other with their outer legs 520a.2, 520a.3, 520b.2 and 520b.3 to form the transformer winding window for receiving the transformer winding turns.

The lower current transformer windings 506.1, 506.2 in this embodiment are conventional windings with bobbins and arranged next two each other on the first outer legs 520a.2 and 520a.3 of the transformer core elements 512 and 513. The first higher current transformer winding part 507.1 is arranged on the first outer leg 520a.2 of the first transformer core element 512, between the flange 522.2 of the first transformer core element 512 and the first lower current transformer winding part 506.1. The second higher current transformer winding part 507.2 is arranged on the first outer leg 520a.3 of the second transformer core element 513, between the flange 522.3 of the second transformer core element and the second lower current transformer winding part 506.2.

Figure 10B:
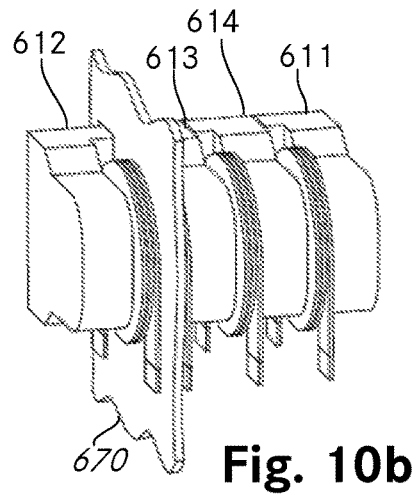
FIGS. 10a and 10b are geometrical views of another embodiment of the invention. This embodiment is similar to embodiment shown in FIGS. 9a and 9b, but wherein the lower current winding is implemented by a printed circuit board.
Figure 10A:
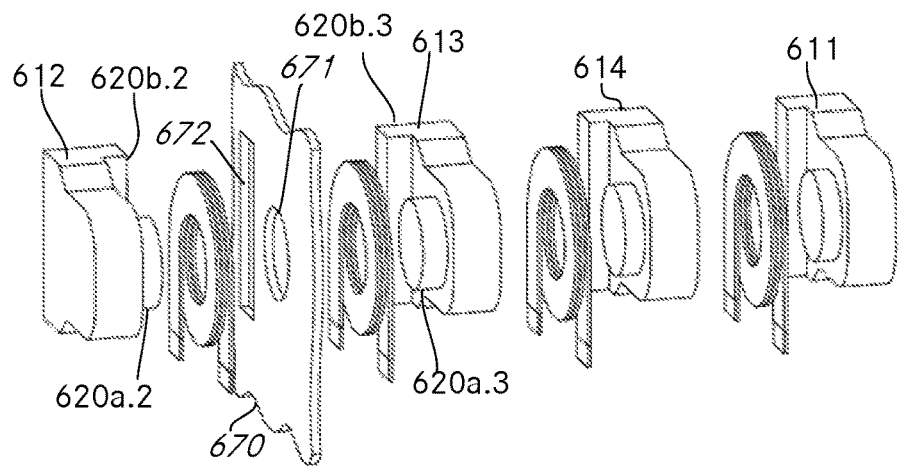

FIGS. 10a and 10b are geometrical views of another embodiment of the invention. This embodiment is similar to embodiment shown in FIGS. 9a and 9b, and also has the same magnetic core structure comprising a first and a second transformer core element 612 and 613 and a first and a second filter core element 611 and 614. But in this embodiment the two lower current transformer winding parts are arranged on a printed circuit board 670, which itself is arranged between the first higher current transformer winding part 607.1 and the second higher current transformer winding part 607.2. The printed circuit comprises a circular aperture 671 for receiving the first outer legs 620a.2 and 620a.3 of the first and second core element 612 and 613, respectively the transformer air gap between the first outer legs 620a.2 and 620a.3 of the first and second transformer core element 612 and 613. The printed circuit board 670 further comprises a rectangular aperture 672 for receiving the second outer legs 620a.2 and 620a.3 of the first and second transformer core elements 612 and 613. By comparing FIGS. 9a, b to FIGS. 10a, b. it can be seen that the outer legs 620 of the transformer core elements 612 and 613 can be designed shorter compared to the transformer core elements 512 and 513 according to FIGS. 9a, b, as the printed circuit board allows a flat design of the lower current transformer windings 606.1 and 606.2.

Figure 11:
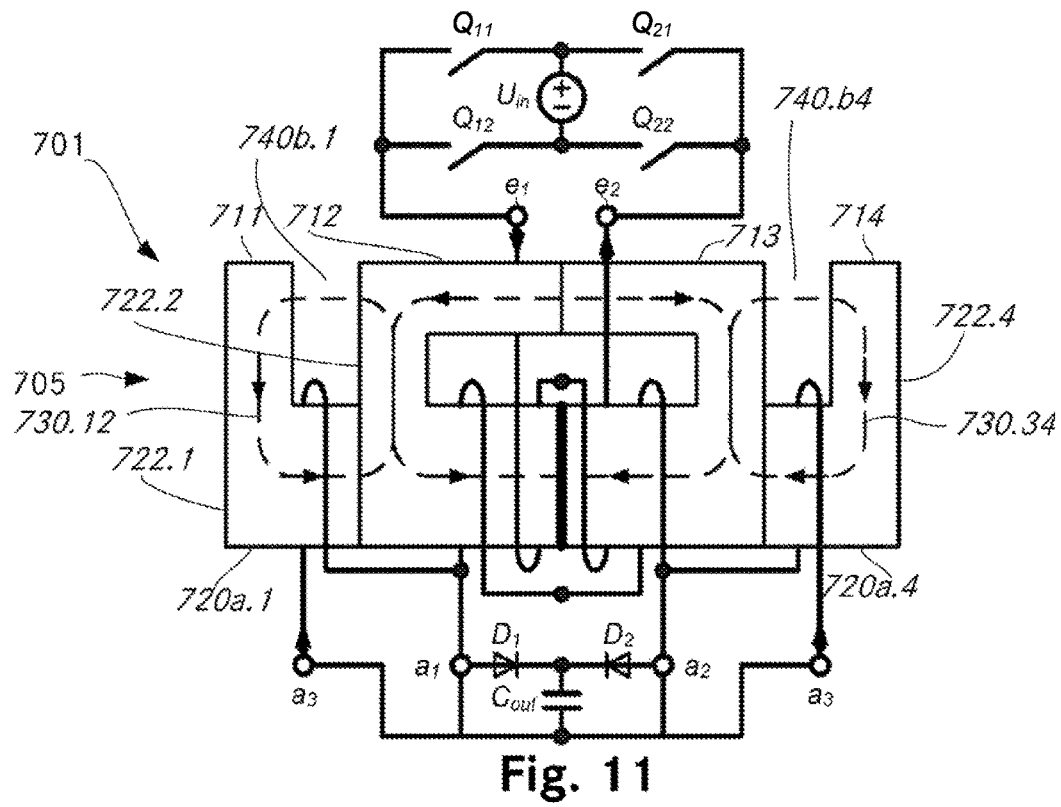
FIG. 11 illustrates another embodiment of the integrated magnetic component according to the invention, implemented in a DC-DC switched mode power converter with a current-doubler rectifier, the integrated magnetic component comprising U-shaped transformer core elements and L-shaped filter core elements.

The embodiment of the integrated magnetic component 701 shown in FIG. 11 is similar to the integrated magnetic component 201 depicted in FIG. 3. The magnetic core structure 705 of the embodiment shown in FIG. 11 also comprises two U-shaped transformer core elements 712 and 713 abutting each other with their outer legs to form an O-shape transformer core section. The magnetic core structure 705 further comprises a first filter core element 711 and a second filter core element 714. Both filter core elements 711, 714 comprise a flange 722.1, 722.4 and a first outer leg 720a.1, 720a.4 being arranged on the respective flange 722.1, 722.4. In comparison to the U shaped-core filter core elements 211 and 214 of FIG. 3, the second outer legs of the filter core elements 711 and 714 have been omitted respectively shortened to a length of zero or close to zero, so that the filter core elements are L-shaped and, represent a special case of U-shaped core elements, wherein one of the outer legs has the length of zero respectively close to zero.

The first filter core element 711 is stacked with its first outer leg 720a.1 on the flange 722.2 of the first transformer core element 712, in a way that the first filter core element 711 and the flange 722.2 of the first transformer core element 712 define a first filter flux path 730.12, which is closed through a large first filter air gap 740b.1 between the flange 722.1 of the first filter core element 711 and the flange 722.2 of the first transformer core element 712.

The second filter core element 714 is stacked with its first outer leg 720a.4 on the flange 722.3 of the second transformer core element 713, in a way that the second filter core element 714 and the flange 722.3 of the second transformer core element 713 define a second filter flux path 730.34, which is closed through a large second filter air gap 740b.4 between the flange 722.3 of the second transformer core element 713 and the flange 722.4 of the second filter core element 714.

Figure 12:
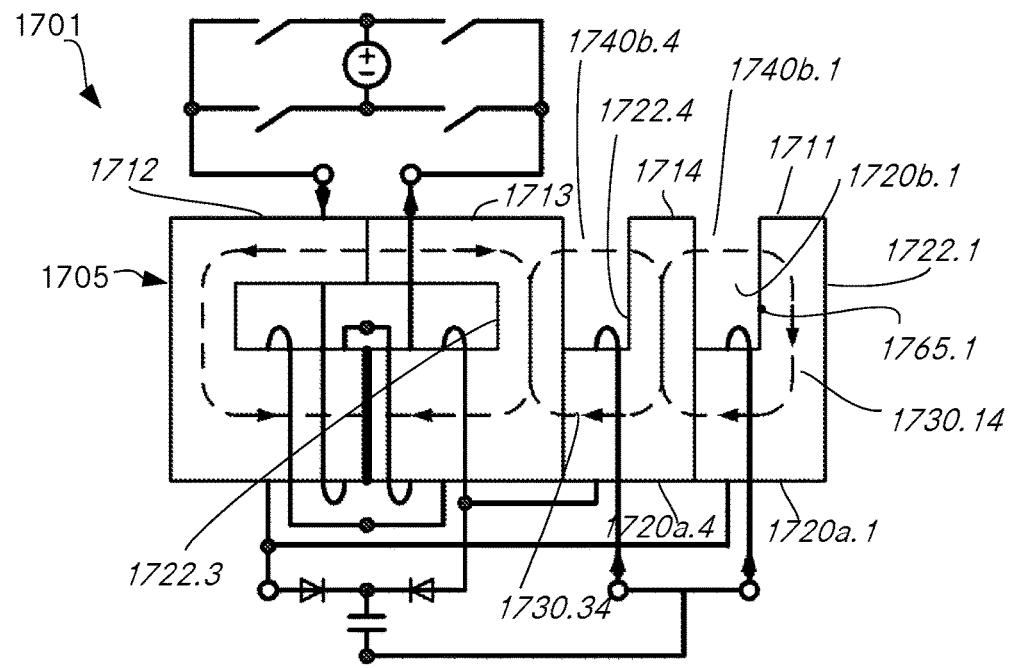
FIG. 12 illustrates one more embodiment of the integrated magnetic component according to the invention, which is similar to the embodiment shown in FIG. 11, but wherein the filter core elements are stacked together.

The embodiment of the integrated magnetic component 1701 shown in FIG. 11 is similar to the integrated magnetic component 501 depicted in FIG. 8. The magnetic core structure 1705 of the embodiment shown in FIG. 12 also comprises two U-shaped transformer core elements 1712 and 1713 abutting each other with their outer legs to form an O-shaped transformer core section. The magnetic core structure 1705 further comprises a first filter core element 1711 and a second filter core element 1714. Both filter core elements 1711, 1714 comprise a flange 1722.1, 1722.4 and a first outer leg 1720a.1, 1720a.4 being arranged on the respective flange 1722.1, 1722.4. In comparison to the U shaped-core filter core elements 511 and 514 of FIG. 8, the second outer legs of the filter core elements 1711 and 1714 have been omitted respectively shortened to a length of zero or close to zero, so that the filter core elements are L-shaped and, represents a special case of U-shaped core elements, wherein one of the outer legs has the length of zero respectively close to zero.

The second filter core element 1714 is stacked with its first outer leg 1720a.4 on the flange 1722.3 of the second transformer core element 1713, in a way that the flange 1722.3 of the second transformer core element 1713 and the second filter core element 1714 define a second filter flux path 1730a.34, which is closed through a large second filter air gap 1740b.4 between the flange 1722.3 of the second transformer core element 1713 and the flange 1722.4 of the second filter core element 1714.

The first filter core element 1711 is stacked with its first outer leg 1720a.1 on the flange 1722.4 of the second filter core element 1714, in a way that the first filter core element 1711 and the flange 1722.4 of the second filter core element 1714 define a first filter flux path 1730.14, which is closed through a large first filter air gap 1740b.1 between the flange 1722.4 of the second filter core element 1714 and the flange 1722.1 of the first filter core element 1711.

Figure 13:
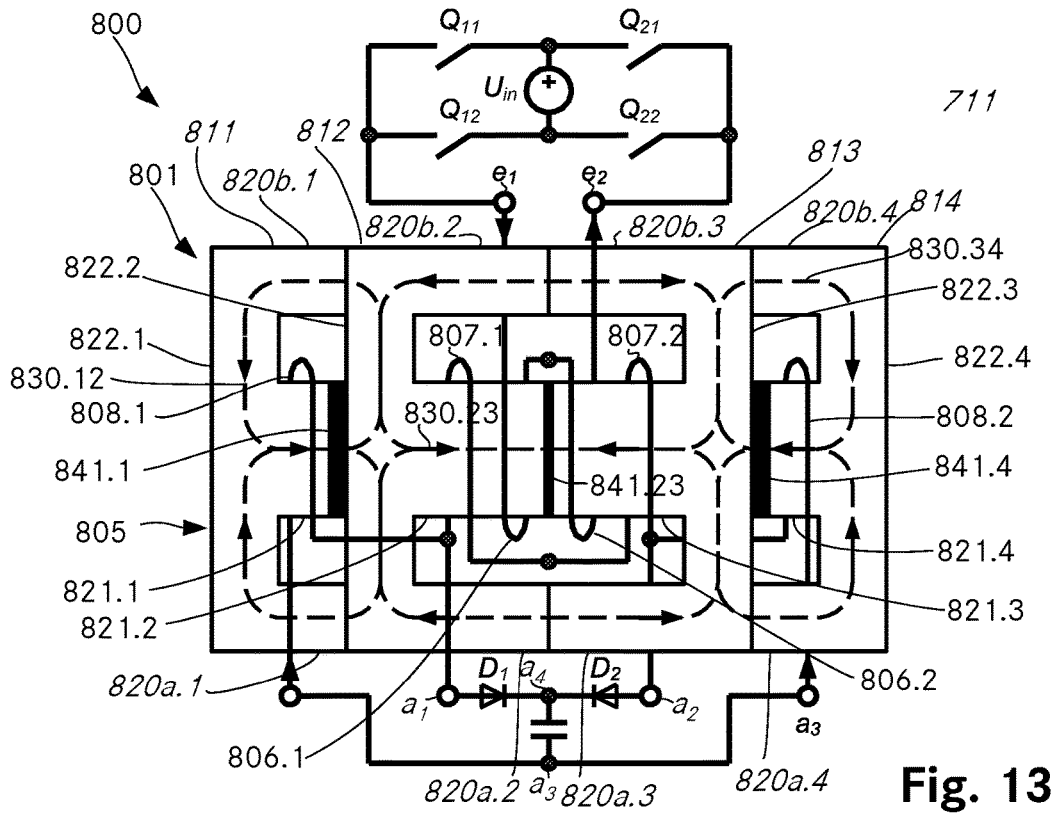
FIG. 13 illustrates another embodiment of the integrated magnetic component according to the invention, implemented in a DC-DC switched mode power converter with a current-doubler rectifier, the integrated magnetic component comprising three-leg-core-elements.

FIG. 13 shows another embodiment of the integrated magnetic component 801, which implements the integrated magnetic component 101 depicted in the electrical circuit diagram of the switched mode DC-DC power converter 100 according to FIG. 1.

The integrated magnetic component 801 is in many points similar to the integrated magnetic component 201 according to FIG. 3. However, its single magnetic core structure 805 comprises four linearly stacked three-leg-core-elements, instead of U-shaped core elements respectively U-cores, namely a first transformer core element 812, a second transformer core element 813, a first filter core element 811 and a second filter core element 814.

Each of said core elements 811, 812, 813 and 814 comprises a first outer leg 820a, a second outer leg 820b, an inner leg 821 and a flange 822. The two transformer core elements 812 and 813 are facing each other with their first outer legs 820a.2, 820a.3, their second outer legs 820b.2, 820b.3 and their inner legs 821.2, 821.3 and form an 8-like shaped transformer core section having two window like openings providing a first transformer winding window and a second transformer winding window for receiving the turns of a first and a second lower current transformer winding part 806.1, 806.2 and a first and a second higher current transformer winding part 807.1, 807.2. The higher current transformer winding parts 807.1, 807.2 and the lower current transformer winding parts 806.1, 806.2 are forming the isolating transformer of the switched mode DC-DC power converter 800, corresponding to the isolation transformer 103 in the circuit diagram of FIG. 1. The higher current transformer winding parts 807.1, 807.2 and the lower current transformer winding parts 806.1, 806.2 are arranged on the inner legs 821.2 and 821.3 of the transformer core elements 812, 813 in a sandwich-like manner, in a way that the lower current transformer winding parts 806.1, 806.2 are arranged between the higher current transformer winding parts 807.1, 807.2. The higher current transformer winding parts 807.1, 807.2 are realized as edgewise wound windings parts, allowing them to support a high current.

The two-dimensional representation of the magnetic circuit of the magnetic core structure 805 in FIG. 13 has to be understood symbolically. The width of respective sections along the flux paths 830 represents the cross section of a respective core section. For instance, the inner legs 821.1-4 have a larger cross section than the outer legs 820a.1-820a.4 or 820b.1-820b.4.

In its simplest form, the four three-leg-core-elements 811, 812, 813 and 814 depicted in FIG. 13 may be standardized E-shaped core elements, such as E-cores having the form of a right prism, with a basic shape having the form of an E as depicted, and where the flanges and legs of the E-cores have a basically rectangular cross section.

A relatively short transformer air gap 841.23 is arranged between the inner legs 821.2, 821.3 of the first transformer core element 812 and the second transformer core element 813. This transformer air gap 841.23 reduces negative influences due to variation in permeability of the core material, which is typically ferrite. The permeability of ferrite may vary up to 30% from one batch to another batch. The relatively short transformer air gap 841.23 also allows for defining the magnetizing current. It also allows to largely avoiding saturation of the core material, in order that the integrated magnetic component can be operated in the linear range of the core magnetization characteristic of the core material.

The first filter core element 811 is stacked on the flange 822.2 of the first transformer core element 812, such that its first outer leg 820a.1, its second outer leg 820b.1 and its inner leg 821.1 are abutting the flange 822.2 of the first transformer core element 812 on the side opposite to the legs 820a.2, 820b.2, 821.2 of the first transformer core element 812. The neighboring core elements 811 and 812 define two window like openings for receiving winding turns of the first filter winding 808.1 which is arranged on the inner leg 821.1 of the first filter core element 811 and defines together with the magnetic core structure 805 the inductance of the first filter inductor Ls1 (FIG. 1). A first filter air gap 841.1 is placed between the flange 822.2 of the first transformer core element 812 and the inner leg 821.1 of the first filter core element 811.

The second filter core element 814 is stacked on the flange 822.3 of the second transformer core element 813, such that its first outer leg 820a, its second outer leg 820b.4 and its inner leg 821.4 are abutting the flange 822.3 of the second transformer core element 813 on the side opposite to the legs 820a.3, 820b.3, 821.3 of the second transformer core element 813. The neighboring core elements 813 and 814 define two window like openings for receiving winding turns of the second filter winding 808.2 which is arranged on the center leg 821.4 of the second filter core element 814. The second filter winding 808.2 and the magnetic core structure define the inductance of the second filter inductor Ls2 (FIG. 1). A second filter air gap 841.4 is placed between the flange 822.3 of the second transformer core element 813 and the inner leg 821.4 of the second filter core element 814.

The air gaps 841.1, 841.4, 841.23 can be achieved by grinding the respective inner legs 821.1, 821.2, 821.3 or 821.4. They may be filled with air or any other material of low magnetic permeability.

In FIG. 13 also the three independent magnetic paths of the integrated magnetic component 801 are depicted, each of which runs around one of the three winding windows:

a) A transformer flux path 830.23 runs through the transformer core elements 812 and 813 around the transformer winding windows, with a forward flux through the inner legs 821.2, 821.3 and the air gap 841.23 and a return flux path through the outer legs 820a.2, 820a.3, 820b.2, 820b.3, the changing direction of the flux over an operation cycle period Ts being indicated by arrows pointing in different directions;

b) a first filter flux path 830.12 runs around the first filter winding windows through the first filter core element 811 and the flange 822.2 of the first transformer core element 812; with a forward flux through the inner leg 821.1, and the first filter air gap 841.1 and a return flux path through the outer legs 820a.1 and 820b.1, the flux over an operation cycle period Ts does not change its direction;

c) a second filter flux path 830.34 around the second filter winding windows, through the second filter core element 814 and the flange 820.3 of the second transformer core element 813; with a forward flux through the inner leg 821.4, and the second filter air gap 841.4 and a return flux path through the outer legs 820a.4 and 820b.4, the flux over an operation cycle period Ts does not change its direction.

Herein the first filter flux path 830.12 and the transformer flux path 830.23 share the flange 822.2 of the first transformer core element 812, whereas, the second filter flux path 830.34 and the transformer flux path 830.23 share the flange 822.3 of the second transformer core element 813. Therefore the required core material of the integrated magnetic component is reduced.

The first lower current transformer winding part 806.1, the second lower current transformer winding part 806.2, the first higher current transformer winding part 807.1 and the second higher current transformer winding part 807.2 are all arranged on one of the inner legs of both transformer core elements 812 and 813, namely on the first inner leg 821.2 of the first transformer core element 812 and/or the first inner leg 821.3 of the second transformer core element 813.

The lower current transformer winding parts 806.1 and 806.2 are connected in series. The free end of the first lower current transformer winding part 806.1 represents a first input terminal e1 of the integrated magnetic component 801 and the free end of the second lower current transformer winding part 806.2 represents the second input terminal e2 of the integrated magnetic component 801.

Upstream of the integrated magnetic component 801, the switched mode DC-DC power converter 800 comprises a full-bridge converter with a switch network of four switches Q11, Q12, Q21 and Q22. The switch network provides a square voltage output between the first and second input connection point e1 and e2 of the integrated magnetic component from a DC input voltage Uin. The DC input voltage Uin may be provided by a rectifying circuit, such as an AC/DC power factor correction (PFC) converter. Instead of a full-bridge converter with a switch network of four switches a half-bridge rectifier with two switches can also be used.

The higher current transformer winding parts 807.1, 807.2 are also connected in series, the first and the second higher current winding parts 807.1, 807.2 of the transformer having the same winding direction.

The switched mode DC-DC power converter 800 has a similar current-doubler rectifier stage as depicted in circuit diagram depicted in FIG. 1. It comprises a first diode D1 and a second diode D2 as rectifying elements and the first and the second filter winding 808.1 and 808.2. The first filter winding part 808.1 is wound around the inner leg 821.1 of the first filter core element 811 whereas the second filter winding 808.2 is wound around the inner leg 820a.4 of the second filter element 814.

The first and the second filter winding 808.1 and 808.2 are connected in series, sharing a common connection point a3 together with the output capacitor Cout. In a first filter connection point a1, the first filter winding 808.1 is connected to a free end of the first higher current transformer winding part 807.1 and also to the anode of the first diode D1. In a second filter connection point a2, the second filter winding 808.2 is connected to a free end of the second higher current transformer winding part 807.2 and also to the anode of the second diode D2. Both diodes are connected in an output connection point a4 with their cathodes to the free terminal of the output capacitor Cout. The output connection point a4 and the common connection point a3 are forming the outputs of the integrated magnetic component.

The first filter inductance Ls1 of the circuit is defined by the first filter winding 808.1 wound around the inner leg 822.1 of the first filter core element 811 and the first filter air gap 841.1 between first inner leg 822.1 and the flange 822.2 of the first transformer core 812.

Similarly, the second filter inductance Ls2 of the circuit is defined by the second filter winding 808.2 wound around the inner leg 821.4 of the second filter core element 814 and the second filter air gap 841.4 between the inner leg 821.4 of the second filter core element 814 and the flange 822.3 of the second transformer core element 813.

FIGS. 14a and 14b are simplified geometrical views of the integrated magnetic component 801 of FIG. 13. Herein FIG. 14a is an explosive view of the integrated magnetic component 801 and FIG. 14b an isometric view of the same component in assembled form. In both geometrical views the printed circuit board connecting the filter windings and the higher current winding parts and comprising the diodes D1, D2 has been omitted.

The integrated magnetic component 801 comprises four stacked three-leg-core-elements 811-814, as already schematically depicted in FIG. 13. Those three-leg-core-elements are optimized for use with edgewise wound winding parts. The flanges 822.1-822.4 of the core elements have the form of a right prism with a base area 860 which is composed by a juxtaposition of a first outer rectangular section 861, a first isosceles trapezoidal section 862, a central rectangular section 863, a second isosceles trapezoidal section 864 and a second outer rectangular section 864, wherein the first isosceles trapezoidal section 862 connects the first and the central rectangular section 861, 863 and the second isosceles trapezoidal section 864 connects the central rectangular section 863 and the outer rectangular section 865.

The inner legs (only the inner legs 821.1, 821.4 of the second transformer core element 813 and the second filter core element 814 are visible) of the four three-leg-core-elements 811-814 have a cylindrical shape and are adapted for receiving windings respectively winding parts with a circular inner diameter. Those inner legs are arranged on respective flanges 822.1-822.4 in the region of the central rectangular sections (863, only referring to the first filter core element 811). Parallel to the inner legs, the first outer legs 820a.1-820a.4 and the second outer legs 820b.1-820b-4 are arranged on the respective flanges 822.1-822.4 in the region of the first and second outer rectangular sections (861 and 865, only referring to the first filter core element 811)

The difference in length between the shorter cylindrical inner legs and the outer legs 820b.1-820b.4 defines the filter air gaps 841.1, 841.4 and the transformer air gap 841.23 (see FIG. 13). For increasing the mechanical stability, the air gaps might be filled with a non-permeable or a low-permeable material.

The three-leg-core-elements 811-814 are made out of a similar material as the U-shaped core elements 211-214, according to FIG. 6a-6d.

Also, the winding arrangement of the integrated magnetic component 810 is similar to the one shown in FIGS. 6a-d. However, in this embodiment, the winding parts are arranged on the cylindrical inner legs instead of the first outer legs.

The higher current transformer winding parts 807.1 and 807.2 and the filter windings 808.1 and 808.2 are preferably mounted on a printed circuit board (which is not shown), similar as described in reference to FIG. 6a-6d. Because of the mechanical stability of the edgewise wound winding parts, the entire magnetic core structure including the windings can be supported by the printed circuit board, wherefore no particular mechanical support has to be provided. Also here, the circuit board may include surface mounted diodes D1 and D2 or other rectifying elements of the current doubler stage (104, FIG. 1). The arrangement of the electrical components, here the diodes D1 and D2, on the printed circuit board, allows for a compact design of the integrated magnetic component 801.

The printed circuit boards also provides for the electrical connections between the higher current transformer winding parts 807.1, 807.2 and the transformer winding parts 808.1, 808.2. With the above arrangement high DC-output currents of 30 A-200 A at 12 V DC can be achieved at a switching frequency of the switched mode DC-DC power converter of around 100 kHz.

The integrated magnetic component 901, shown in FIGS. 15a and 15b is a variation of the embodiment according FIGS. 13, 14a and 14b. FIG. 15a is an explosive view of the integrated magnetic component 901 and FIG. 15b is an isometric view of the same component, however in assembled form. The printed circuit board is not shown. The core elements of the magnetic core structure, namely the first transformer core elements 912, the second transformer core element 913, the first filter core element 911 and the second filter core element 914 are similar to the core elements 811, 812, 813 and 814, shown in FIGS. 14, 14a and 14b. Also the higher transformer winding parts and the filter winding are similar to the ones shown in FIGS. 13, 14a and 14b.

However, in the integrated magnetic component 901, the two lower current transformer winding parts 906.1 and 906.2 are arranged on a printed circuit board 970, which itself is arranged between the first higher current transformer winding part 907.1 and the second higher current transformer winding part 907.2. The printed circuit comprises a circular aperture 971 for receiving the inner legs (only the inner leg of the second transformer core 921.3 is shown) of the first and second transformer core element 912, 913, respectively the transformer air gap between those inner legs. The printed circuit board 970 further comprises a first and a second rectangular aperture 972a and 972b for receiving the first outer legs 920a.2 and 920a.3 and the second outer legs 920b.2 and 920b.3 of the first and second transformer core element 912, 913. By comparing FIGS. 14a, b to FIGS. 15 a, b. it can be seen that legs of the transformer core elements 912 and 913 can be designed shorter compared to the transformer core elements 912 and 913 according to FIGS. 14 a, b.

Figure 16A:
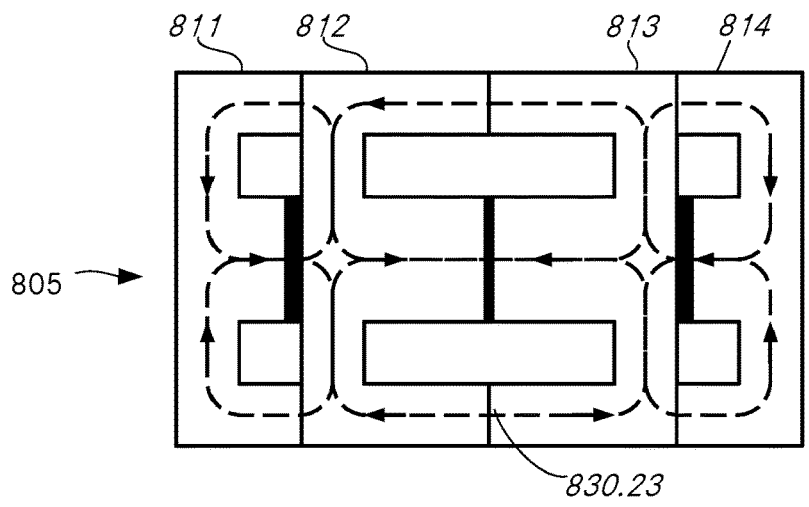
FIG. 16a illustrates the built-up of the magnetic core structure of the integrated magnetic component according to FIG. 13; by using four three-leg-core-elements.
Figure 16B:
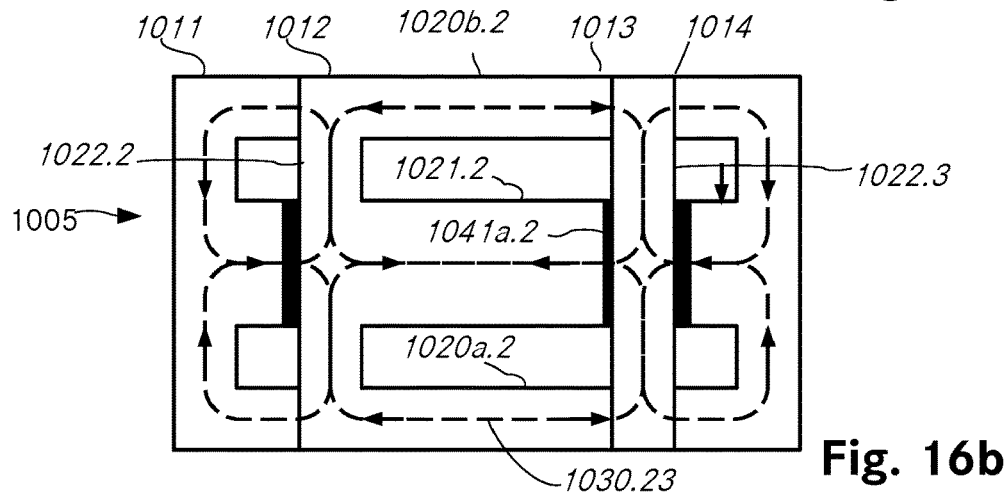
Figure 16C:
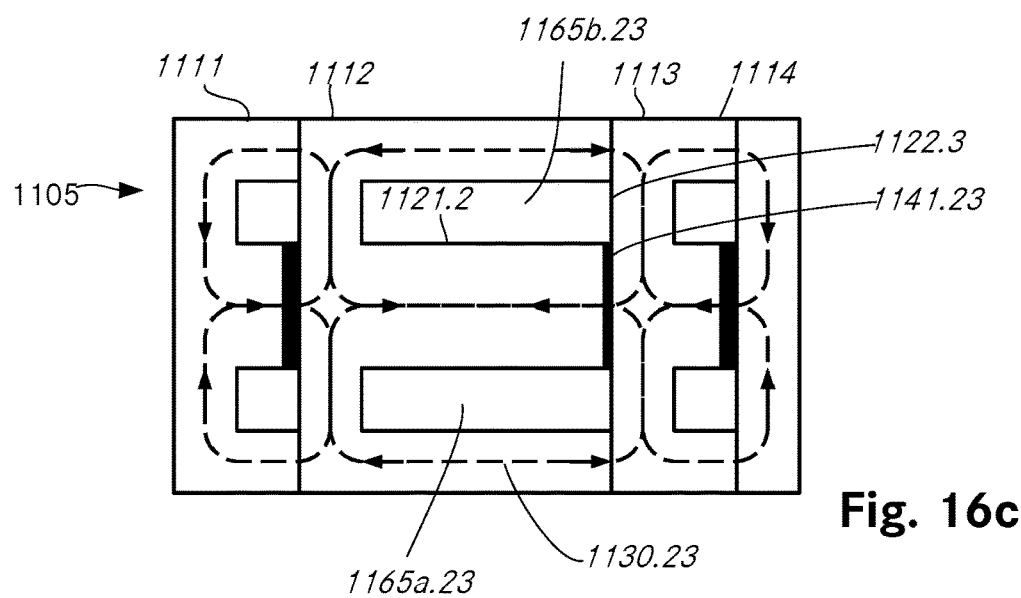

FIGS. 16a-c show variations of the magnetic core structure of the integrated magnetic component according to the invention.

FIG. 16a depicts the magnetic core structure 805 of the integrated magnetic component 801 according to FIGS. 13, 14a and 14b. In FIG. 16b a similar magnetic core structure 1005 is shown. However, in this magnetic core structure 1005 the transformer flux path 1030.23 is formed by a first transformer core element 1012, being a three-leg core element, such as an E-core, and a second transformer core element 1013, being an I-core. The first and the second filter core elements 1011 and 1014 are identical to the ones of the magnetic core structure 805 (FIG. 16a).

The first transformer core element 1012 comprises a first outer leg 1020*a*.2, a second outer leg 1020*b*.2, an inner leg 1021.2 and a flange 1022.2, whereas the second transformer core element 1013 is an I-core having a flange 1022.3, but no legs. The first transformer core element 1012 is abutting the flange 1022.3 of the second transformer core element with its outer legs 1020*a*.2, 1020*b*.2 and its inner leg 1021.2 to form an 8-shaped transformer core section. The first filter core element 1011 is abutting with its legs the flange 1022.2 of the first transformer core element 1012 on the side opposite to the outer legs 1020*a*.2, 1020*b*.2 and the inner leg 1021.2 of the first transformer core element 1012. Likewise, the second filter core element 1014 is abutting with its legs the flange 1022.3 of the second transformer core element 1013 on the side opposite to the outer legs 1020*a*.2 1020*b*.2 and the inner leg 1021.2 of the first transformer core element 1012. The transformer air gap 1041.23 is arranged between the inner leg 1021.2 of the first transformer core element 1012 and the flange 1022.3 of the second transformer core element 1013, which is an I-core.

The magnetic core structure 1105 depicted FIG. 16*c* is another variation of the magnetic core structure 805 shown in FIG. 16*a*. However, in this embodiment of the magnetic core structure 1105 the 8-shaped transformer core section of the magnetic core structure 1105, which defines the transformer flux path 1130.23 respectively the first and second transformer winding window 1165*a*.23 and 1165*b*.23 for receiving the transformer winding turns, is formed by the first transformer core element 1112, being a three-leg core element, and a flange 1122.3 of a second transformer core element 1113, also being a three-leg core element. The transformer air gap 1141.23 is arranged between the inner leg 1121.2 of the first transformer core element 1112 and the flange 1122.3 of the second transformer core element 1113.

Figure 17:
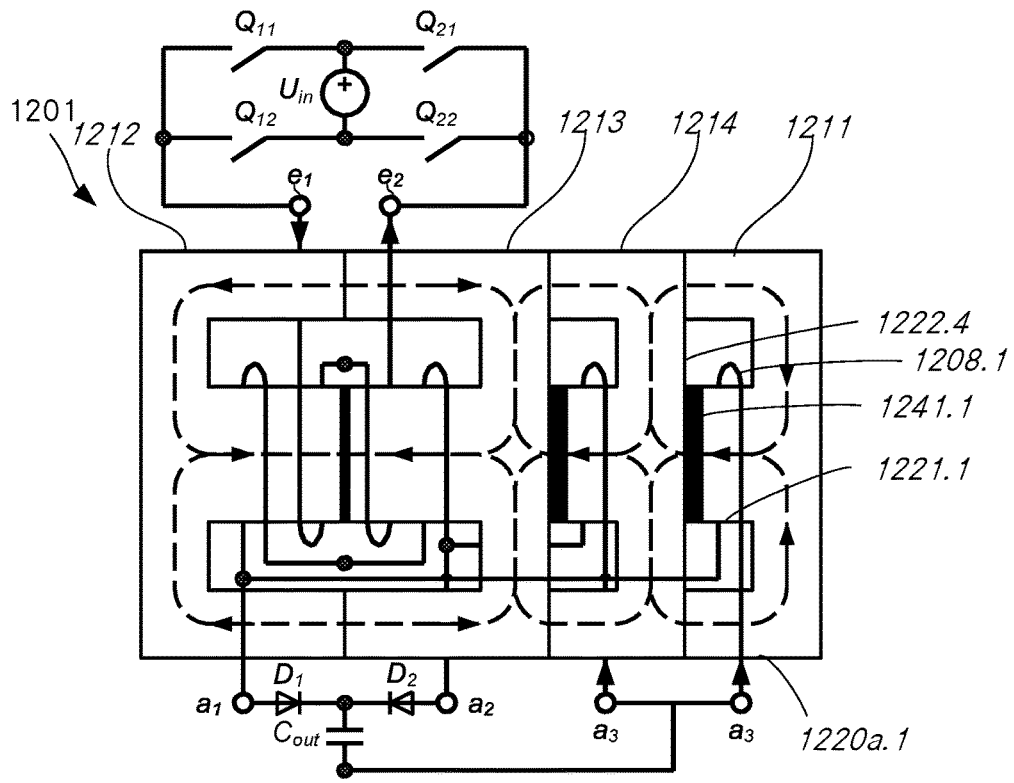
FIG. 17 illustrates another embodiment of the integrated magnetic component according to the invention; the integrated magnetic component comprising three-leg-core-elements, wherein the filter elements are stacked together.

FIG. 17 shows another embodiment of the integrated magnetic component 1201. This embodiment is also similar to the embodiment shown in FIG. 13. The magnetic core structure 1205 of this embodiment also comprises two three-leg transformer core elements 1212 and 1213 and two filter core elements 1211 and 1214. However, in this embodiment, the first filter core element 1211 is stacked on the flange 1222.4 of the second filter core element 1214, wherein the first and second outer legs 1220*a*.1, 1220*b*.1 and its inner leg 1221.1 abut the flange 1222.4 of the second filter core element 1214. The first filter air gap 1241.4 is arranged between the inner leg 1221.1 of the first filter core element 1211 and the flange 1222.4 of the second filter core element 1214. The first filter winding part 1208.1 is arranged on the center leg 1221.1 of the first filter core element 1211.

Figure 18A:
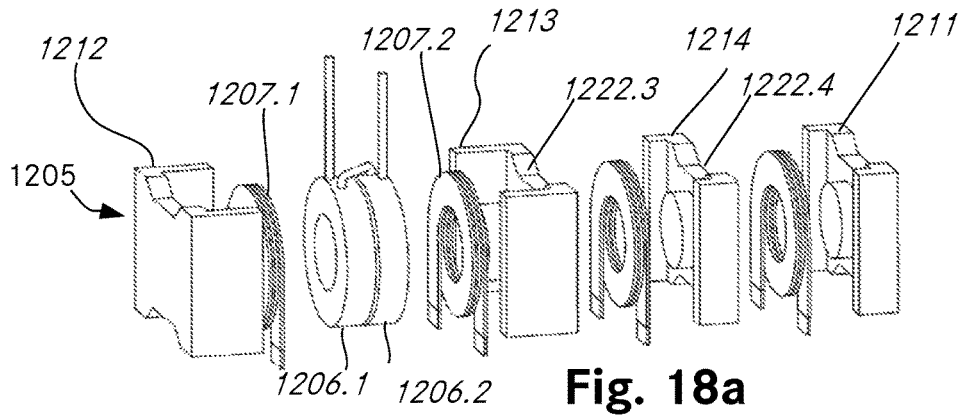
Figure 18B:
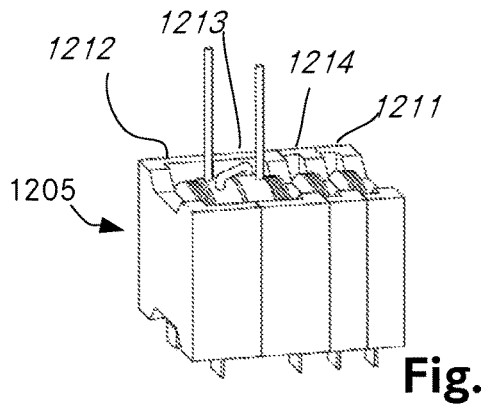

FIGS. 18*a* and 18*b* are geometrical views of the embodiment schematically depicted in FIG. 17 wherein FIG. 18*a* is an explosive view of the integrated magnetic component and FIG. 18*b* is a view of the same component, however in assembled form. The printed circuit board for connection the edgewise wound winding parts is not shown. The core elements of the magnetic core structure 1205, namely the first and the second transformer core elements 1212 and 1213 and the first filter core element 1211 and the second filter core element 1214 are similar to the core elements 811, 1812, 813 and 814, shown in FIGS. 14*a* and 14*b*. Also, the transformer winding parts and the filter windings are similar to the ones shown in FIGS. 14*a* and 14*b*.

In the magnetic core structure 1205 according to FIGS. 18*a* and 18*b*, the first filter core element 1211 is stacked with its legs on the flange 1222.4 of the second filter core element 1214, which itself is stacked with its legs to the flange 1222.3 of the second transformer core element 1212. The first transformer core element 1212 and the second transformer core element 1213 are abutting each other with their legs to form the transformer winding windows for receiving the transformer winding turns.

The lower current transformer windings 1206.1, 1206.2 in this embodiment are conventional windings with bobbins and arranged next to each other on the inner legs of the transformer core elements 1212 and 1213, between the first higher current transformer winding part 1207.1 and the second higher current transformer winding part 1207.2.

Figure 19B:
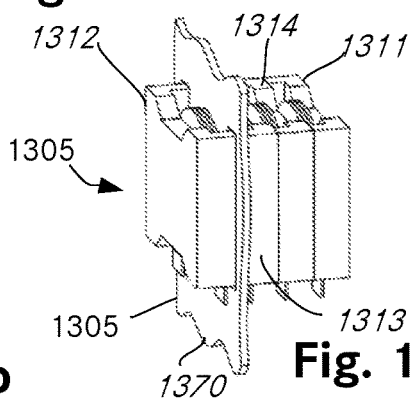
FIGS. 19a and 19b are geometrical views of another embodiment of the invention. This embodiment is similar to the embodiment shown in FIGS. 18a and 18b, but wherein the lower current winding is implemented by a printed circuit board.
Figure 19A:
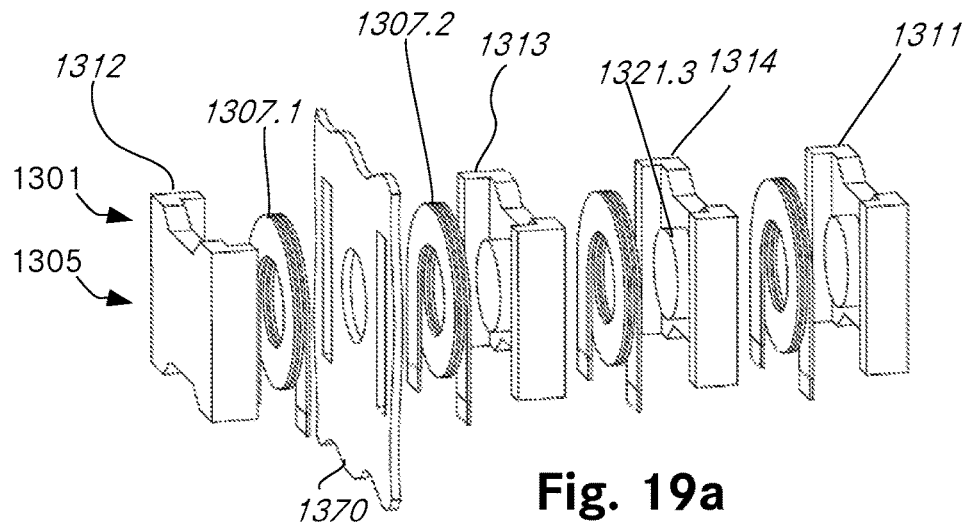
Figure 21:
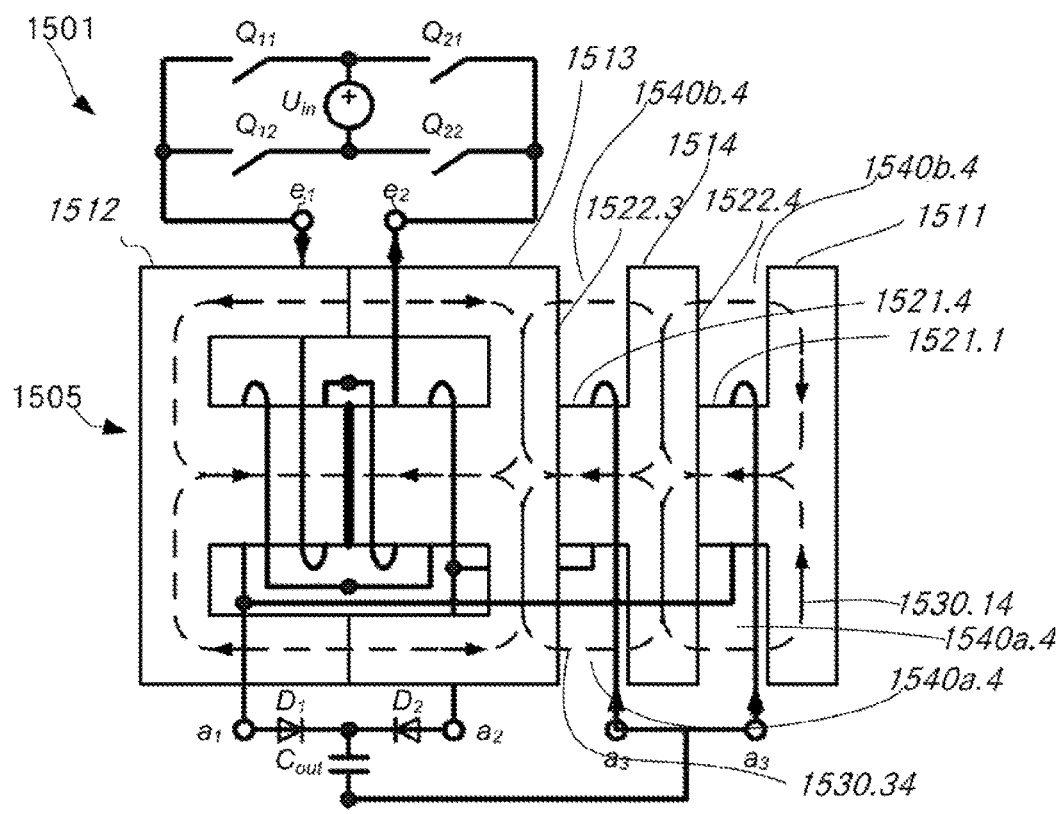
FIG. 21 illustrates another embodiment of the integrated magnetic component according to the invention, the integrated magnetic component comprising three-leg transformer core elements and T-shaped filter core elements, wherein the filter core elements are stacked together.

FIGS. 19*a* and 19*b* are geometrical views of another embodiment of the invention. This embodiment of the integrated magnetic core structure 1305 is similar to the embodiment represented in FIGS. 18*a* and 18*b* and also has the same magnetic core structure 1305 comprising a first and a second transformer core element 1312 and 1313 and a first and a second filter core element 1311 and 1314.

However, in the integrated magnetic component 1301, the two lower current transformer winding parts are arranged on a printed circuit board 1370, which itself is arranged between the first higher current transformer winding part 1307.1 and the second higher current transformer winding part 1307.2 and which is identical to the printed circuit board 970 depicted in FIGS. 15*a* and 15*b*.

Figure 20:
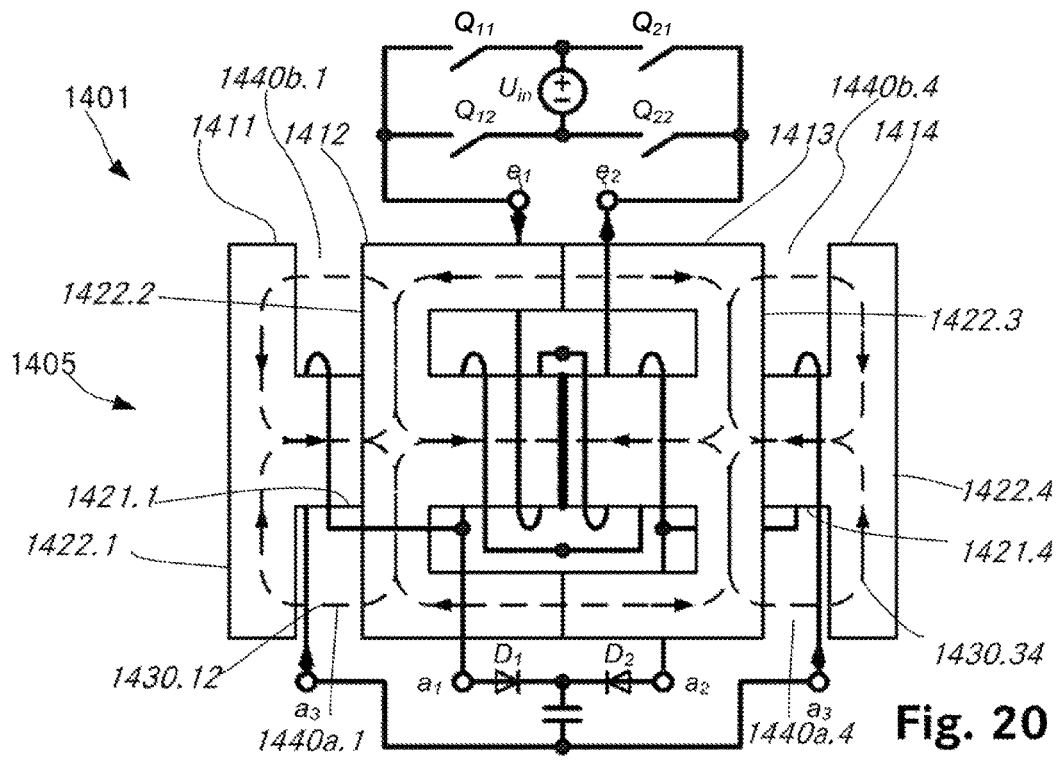
FIG. 20 illustrates another embodiment of the integrated magnetic component according to the invention, implemented in a DC-DC switched mode power converter with a current-doubler rectifier, the integrated magnetic component comprising three-leg transformer core elements and T-shaped filter core elements.

FIG. 20 depicts another embodiment of the integrated magnet component 1401 according to the invention. This integrated magnetic component is also similar to the embodiment according to FIG. 13; however the magnetic core structure 1405 of this embodiment has large filter air gaps. The 8-shaped transformer core section which is formed by the first filter core element 1412 and the second filter core element 1413 is identical to the respective section of the magnetic core structure 805 according to FIG. 13. It comprises two three-leg respectively E-shaped transformer core elements 1412 and 1413 which are abutting each other with their legs to form the 8-shape transformer core section. The magnetic core structure 1405 further comprises a first filter core element 1411 and a second filter core element 1414. Both filter core elements 1411, 1414 comprise a flange 1422.1, 1422.4 and an inner leg 1421.1, 1421.4 being arranged on the respective flange 1422.1, 1422.4. In comparison to the three-leg respectively E-shaped filter core elements 811 and 814 of FIG. 13, the outer legs of the filter core elements 1411, 1414 of the present embodiment of the integrated magnetic component 1401 have been omitted respectively shortened to a length of zero or close to zero, so that the filter core elements are T-shaped, having a single inner leg 1421.1, 1421.2 and representing a special case of an E-shaped core element, wherein the outer legs have the length of zero respectively close to zero.

The first filter core element 1411 is stacked with its inner leg 1421.1 on the flange 1422.2 of the first transformer core element 1412, in a way that the first filter core element 1411 and the flange 1422.2 of the second transformer core element 1412 define a first filter flux path 1430.12, which is closed through a first filter air gap between the flange 1422.1 of the first filter core element 1411 and the flange 1422.2 of the first transformer core element 1412. The air gap is split in a first air gap part 1440*a*.1 and a second air gap part 1440*b*.1, wherein both parts are arranged to the outside in respect to the inner leg 1421.1 of the filter core element 1411.

Likewise, the second filter core element 1414 is stacked with its inner leg 1421.4 on the flange 1422.3 of the second transformer core element 1413, in a way that the second filter core element 1414 and the flange 1422.3 of the second transformer core element 1413 define a second filter flux path 1430.34, which is closed through a second filter air gap between the flange 1422.3 of the second transformer core element 1413 and the flange 1422.4 of the second filter core element 1414. The air gap is split in a first air gap part 1440a.4 and a second air gap part 1440b.4, wherein both parts are arranged to the outside in respect to the inner leg 1421.4 of the second filter core element 1414.

The embodiment of the integrated magnet component 1501 is very similar to the integrated magnetic component according to FIG. 17, but its magnetic core structure 1505 comprises large filter air gaps on outer legs, which are similar to the filter air gaps of the embodiment according to FIG. 20.

The 8-shaped transformer core section of the magnetic core structure 1505, which is formed by the first transformer core element 1512 and the second transformer core element 1513, is equal to the respective section of the magnetic core structure according to FIG. 17. Also, in the integrated magnetic component 1501 the first filter core element 1511 is stacked on the flange 1522.4 of the second filter core element 1514, and the second filter core element 1514 is stacked on the flange 1522.3 of the second transformer core element 1513. However, in contrast to the three-leg respectively E-shaped filter core elements 1211 and 1214 of FIG. 17, the outer legs of the filter core elements 1511 and 1514 have been omitted respectively shortened to a length of zero or close to zero, so that the filter core elements are T-shaped and represent a special case of an E-shaped core element, wherein the outer legs have the length of zero respectively close to zero.

The second filter core element 1514 is stacked with its inner leg 1521.4 on the flange 1522.3 of the second transformer core element 1513, in a way that the second filter core element 1514 and the flange 1522.3 of the second transformer core element 1513 define a second filter flux path 1530.34 between the flange 1522.3 of the second transformer core element 1513 and the flange 1522.4 of the second filter core element 1514, which is closed through a second filter air gap which is split in a first air gap part 1540a.4 and a second air gap part 1540b.4

The first filter core element 1511 is stacked with its inner leg 1521.1 on the flange 1522.4 of the second filter core element 1514, in a way that the first filter core element 1511 and the flange 1522.4 of the second filter core element 1514 define a first filter flux path 1530.14 between the flange 1522.4 of the second filter core element 1514 and the flange 1522.1 of the first filter core element 1511, which is closed through a first filter air gap which is split in a first air gap part 1540a.1 and a second air gap part 1540b.1.

Figure 22:
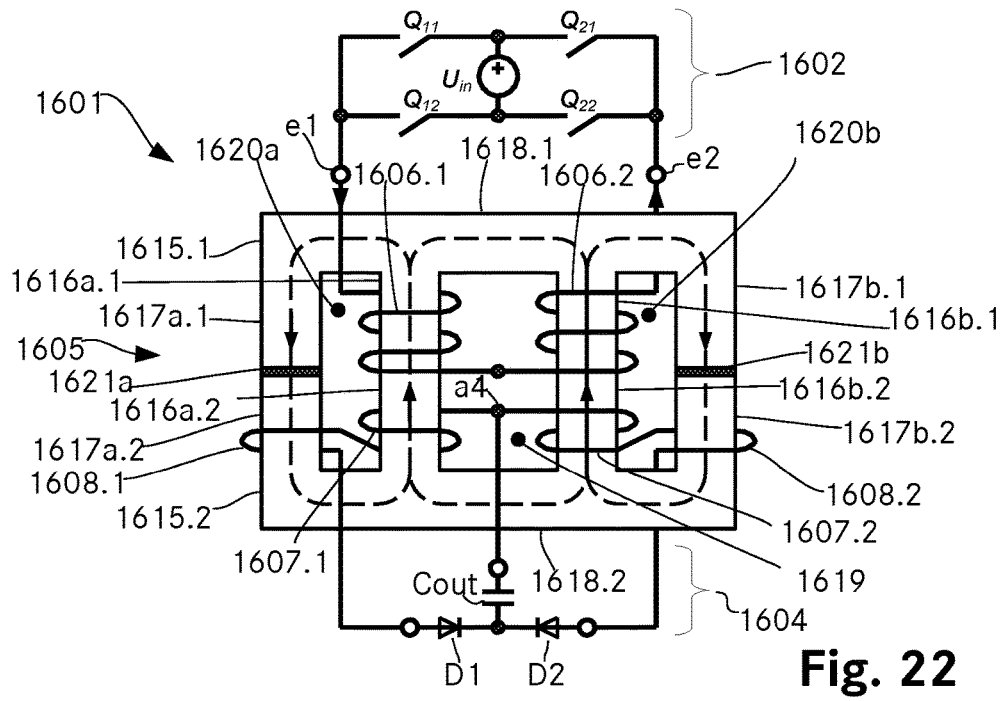
FIG. 22 illustrates another embodiment of the integrated magnetic component according to the invention, wherein the magnetic core structure comprises two four-leg core elements, and which is integrated in a switched-mode DC-DC power converter with a full-wave center-tapped output rectifier.

FIG. 22 shows another DC-DC switched mode power converter 1600 with an integrated magnetic component 1601 according to the invention. In contrast to the DC-DC switched mode power converter shown in FIG. 1, this DC-DC switched mode power converter comprises a full wave center-tapped rectifier stage 1604 at the output instead of the current doubler rectifier stage 104 of FIG. 1.

The single magnetic core structure 1605 of the integrated magnetic component 1601 comprises a first four-leg core element 1615.1 and a second four-leg core element 1615.2, both are preferably made out of ferrite and have the same geometrical shape. Both core four-leg core elements 1615.1 and 1615.2 comprise a first inner leg 1616a.1, 1616a.2, a second inner leg 1616b.1, 1616b.2, a first outer leg 1617a.1, 1617a.2 and a second outer leg 1617b.1, 1617b.2. The two inner legs 1616a.1, 1616a.2, 1616b.1, 1616b.2, and the two outer legs 1617a.1, 1617a.2, 1617b.1, 1617b.2 of both four-leg core elements 1615.1 and 1615.2 are arranged in parallel on one side of the flange 1618.1, 1618.2 of the respective four-leg core element 1615a. 1615b. The two four-leg core elements 1615.1, 1615.2 are abutting each other with their inner legs 1616a.1, 1616a.2, 1616b.1, 1616b.2 and their outer legs 1617a.1, 1617a.2, 1617b.1, 1617b.2. Hereby, the first and the second inner legs 1616a.1, 1616a.2, 1616b.1, 1616b.2 and the flanges 1618.1, 1618.2 of the two four-leg core elements 1615.1, 1615.2 form an inner winding window 1619. The first inner legs 1616a.1, 1616a.2, the first outer legs 1617a.1, 1617a.2 and the flanges 1618.1, 1618.2 of the two magnetic core elements 1615.1, 1615.2 form a first outer winding window 1620a, whereas the second inner legs 1616b.1, 1616b.2, the second outer legs 1617b.1, 1617b.2 and the flanges 1618.1, 1618.2 of the two magnetic core elements 1615.1, 1615.2 form a second outer winding window 1620b.

A first air gap 1621a is arranged between the first outer legs 1617a.1 and 1617a.2 and a second air gap 1621b is arranged between the second outer legs 1617b.1 and 1617b.2 of the first and the second four-leg core elements 1615.1, 1615.2.

A first lower current transformer winding part 1606.1 is arranged on the first inner leg(s) 1616a.1, 1616a.2 of the first and/or the second four-leg core element 1615.1, 1615.2. A second lower current transformer winding part 1606.2, connected in series with the first lower current transformer winding part 1606.1 is arranged on the second inner leg(s) 1616b.1, 1616b.2 of the first and/or the second four-leg core element 1615.1, 1615.2. The free ends of the lower current windings 1606.1 and 1606.2 are connected to a four-switch converter stage 1602 in a first input connection point e1 and a second input connection point e2.

Also a first higher current winding part 1607.1 is arranged on the first inner leg(s) 1616a.1, 1616a.2 of the first and/or the second four-leg core element 1615.1, 1615.2 and a second higher current winding part 1607.2 is arranged on the second inner leg(s) 1616b.1, 1616b.2 of the first and/or the second four-leg core element 15.1,15.2. A first filter winding 1608.1 is arranged on the first outer leg(s) 1617a.1, 1617a.2 of the first and/or second four-leg core element 1615.1, 1615.2 and a second filter winding 1608.2 is arranged on the second outer leg(s) 1617b.1, 1617b.2 of the first and/or second four-leg core element 1615.1, 1615.2. The first filter winding 1608.1 is connected in series with the first higher current transformer winding part 1607.1 and the second filter winding 1608.2 is connected in series with the second higher current transformer winding part 1607.2. Further, both higher current transformer winding parts 1607.1 and 1607.2 are connected in series in an output connection point a4. The free end of the first filter winding 1608.1 is connected to an anode of a first diode D1 and the free end of the second filter winding 1608.2 is connected to an anode of the second diode D2. An output capacitor Cout is connected between the first output connection point a4 and the cathodes of the diode D1 and D2.

The filter windings and the higher current transformer winding parts are edgewise wound winding parts. They also can be connected to a printed circuit board (which is not shown).

Figure 23:
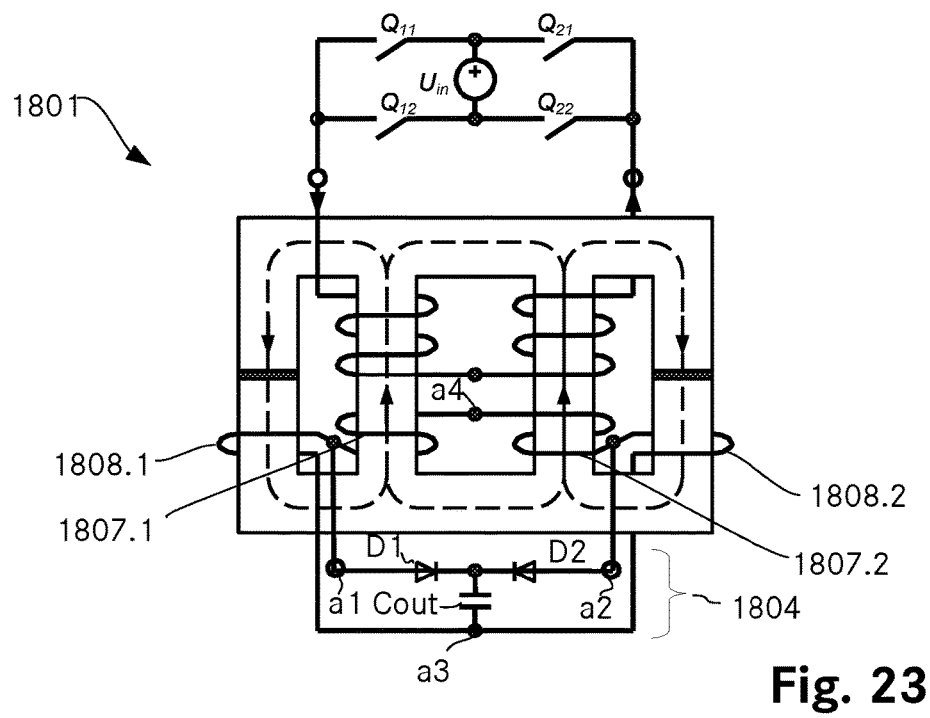
FIG. 23 illustrates a variation of the embodiment of the integrated magnetic component according FIG. 21, wherein the magnetic core structure also comprises two four-leg core elements, but which is integrated in a switched-mode DC-DC power converter with a current doubler rectifier.

The integrated magnetic component 1801 shown in FIG. 23 is similar to the embodiment according to FIG. 22, but comprises a current-doubler rectifier stage 1804 at the output and is thus implementing the circuit shown in FIG. 1. Herein the anode of a first diode D1 of the center-tapped rectifier 1804 is connected to the first filter connection point a1, which is the connection point between the first higher current transformer winding part 1807.1 and the first filter winding 1808.2.

The anode of a second diode D2 of the current-doubler rectifier 1804 is connected to the second filter connection point a2, which is the connection point between the second higher current transformer winding part 1807.2 and the second filter winding 1808.2.

The free ends of the first filter winding 1808.1 and the second filter winding 1808.2 are connected in the common filter connection point a3 to an output capacitor Cout, which is connected with the other end to the cathodes of the first and the second diode D1 and D2.

In summary, it is to be noted that the invention creates an integrated magnetic component for switched mode power converters which further reduces losses and yields to higher power density and simultaneously allows decreasing production costs.

The invention further creates a DC-DC switched mode power converter including such a magnetic component.

The invention claimed is:

1. Integrated magnetic component for a switched mode power converter, the integrated magnetic component comprising:
   a. a single magnetic core structure formed by magnetic core elements, which are linearly stacked;
   b. the magnetic core elements being either leg-core elements with a flange and one or more legs arranged on a same side of the flange or I-cores, the I-cores comprising a single flange,
   c. wherein the magnetic core elements include a first and a second transformer core element, a first filter core element and a second filter core element,
   d. wherein at least one of the transformer core elements and at least one of the filter core elements are leg core elements,
   e. the integrated magnetic component further comprising an isolating transformer with a higher current transformer winding arranged on at least one of the one or more legs of the transformer core elements and a lower current transformer winding arranged on at least one of the one or more legs of the transformer core elements;
   f. and a first filter inductor comprising a first filter winding arranged on at least one of the one or more leg of the filter core elements; and
   g. a second filter inductor comprising a second filter winding arranged on at least one of the or more legs of the filter core elements,
   h. the transformer core elements being stacked in a way that their flanges and their legs are forming at least one transformer winding window, receiving turns of the transformer windings, further, the first filter core element being stacked on the first transformer core element in a way, that the flanges and legs of the first transformer core element and the first filter core element form at least one first filter winding window, receiving turns of the first filter winding, a first filter air gap being provided in a flux path between said filter core element and the first transformer core element, the second filter core element being stacked on the first filter core element, or on a side of the second transformer core element, which is opposite to the first transformer core element, the second filter core element and the neighboring magnetic core element, forming at least one second filter winding window, receiving turns of the second filter winding, a second filter air gap is provided in a flux path between said second filter core element and the neighboring magnetic core element, and wherein
   i. the higher current transformer winding and the first filter winding comprise at least an edgewise wound winding part, wherein the edgewise wound winding part includes at least one turn of a wire having an essentially rectangular cross section with a shorter edge and a longer edge, wherein the wire is wound around a shorter edge of the essentially rectangular cross section.

2. Integrated magnetic component according to claim 1, wherein the transformer core elements and the filter core elements are leg-core-elements, wherein the transformer core elements are abutting each other with their legs.

3. Integrated magnetic component according to claim 1, wherein the leg-core elements are U-cores.

4. Integrated magnetic component according to claim 1, wherein the magnetic core elements are three-leg-core-elements, comprising an inner leg and two outer legs, so that one of the three-leg-core-elements forms with a second of the three-leg-core-elements a first transformer winding window and a second transformer winding window for receiving turns of the transformer windings, wherein the windings of the integrated magnetic component are preferably arranged on the inner legs.

5. Integrated magnetic component according to claim 1, wherein the higher current transformer winding and/or the filter winding(s) are adapted for operating currents of more than 10 A, preferably more than 20 A or more than 30 A (RMS).

6. Integrated magnetic component according to claim 1, wherein the higher current transformer winding of the isolating transformer comprises at least a second edgewise wound winding part, the edgewise wound winding parts of the higher current transformer winding, the lower current transformer winding and/or further winding parts of the lower current transformer winding, are arranged in an interleaving manner along the leg(s) of the two transformer core elements.

7. Integrated magnetic component according to claim 1, wherein the lower current transformer winding is integrated in a printed circuit board.

8. Integrated magnetic component, according to claim 1, wherein at least one of the filter air gaps has a length which is at least 10%, more preferably at least 30%, 50%, 75% or 100% of the length of a distance between the flange of the filter core element and the flange of the magnetic core element being magnetically interconnected by a flux path formed by said filter air gap.

9. Integrated magnetic component according to claim 1, including two magnetic core elements where the legs and the flanges of the two magnetic core elements form at least three adjacent winding windows, wherein turns of the higher current transformer winding are arranged on at least one of the legs, turns of the lower current transformer winding are arranged on at least one of the legs and turns of the filter winding are arranged on an at least one other leg.

10. Integrated magnetic component according to claim 1, which further includes a circuit board, wherein at least one of said edgewise wound winding parts having a first and a second end being oriented in the same direction and being mounted to the circuit board.

11. Integrated magnetic component according to claim 10, the circuit board electrically connecting the higher current transformer winding to the filter winding(s).

12. Integrated magnetic component according to claim 11, which includes a rectifying circuit comprising at least two rectifying elements (D1', D2'), wherein the rectifying elements (D1', D2'), in particular synchronous rectifiers, being mount on the circuit board, which connects the rectifying elements (D1', D2') to the higher current winding of the isolation transformer and to the first filter winding(s).

13. Integrated magnetic component according to claim 12, wherein the rectifying elements (D1, D2) are surface mounted and wherein the rectifying elements (D1, D2) are preferably synchronous rectifiers.

14. Integrated magnetic component according to claim 10, wherein the circuit board is provided with rectangular through holes for mounting the edgewise wound winding parts, the edgewise wound winding parts being adapted to mechanically support the single magnetic core structure.

15. Integrated magnetic component according to any of the claim 12, wherein the rectifying circuit is a current doubler.

16. Integrated magnetic component according to claim 1, wherein the edgewise wound winding parts are wound from enamelled flat wire and/or wherein the lower current transformer winding includes triple insulated wire.

17. Switched mode power converter, especially a switched mode DC-DC power converter, including an integrated magnetic component comprising:
   a. a single magnetic core structure formed by magnetic core elements, which are linearly stacked;
   b. the magnetic core elements being either leg-core elements with a flange and one or more legs arranged on a same side of the flange or I-cores, the I-cores comprising a single flange,
   c. wherein the magnetic core elements include a first and a second transformer core element, a first filter core element and a second filter core element,
   d. wherein at least one of the transformer core elements and at least one of the filter core elements are leg core elements,
   e. the integrated magnetic component further comprising an isolating transformer with a higher current transformer winding arranged on at least one of the one or more legs of the transformer core elements and a lower current transformer winding arranged on at least one of the one or more legs of the transformer core elements;
   f. and a first filter inductor comprising a first filter winding arranged on at least one of the one or more legs of the filter core elements; and
   g. a second filter inductor comprising a second filter winding arranged on at least one of the or more legs of the filter core elements,
   h. the transformer core elements being stacked in a way that their flanges and their legs are forming at least one transformer winding window, receiving turns of the transformer windings, further, the first filter core element being stacked on the first transformer core element in a way, that the flanges and legs of the first transformer core element and the first filter core element form at least one first filter winding window, receiving turns of the first filter winding, a first filter air gap being provided in a flux path between said filter core element and the first transformer core element, the second filter core element being stacked on the first filter core element, or on a side of the second transformer core element, which is opposite to the first transformer core element, the second filter core element and the neighboring magnetic core element, forming at least one second filter winding window, receiving turns of the second filter winding, a second filter air gap is provided in a flux path between said second filter core element and the neighboring magnetic core element, and wherein
   i. the higher current transformer winding and the first filter winding comprise at least an edgewise wound winding part, wherein the edgewise wound winding part includes at least one turn of a wire having an essentially rectangular cross section with a shorter edge and a longer edge, wherein the wire is wound around a shorter edge of the essentially rectangular cross section.

* * * * *